US012718381B2

(12) United States Patent
Guo

(10) Patent No.: US 12,718,381 B2
(45) Date of Patent: Aug. 25, 2026

(54) DATA PROCESSING METHOD AND APPARATUS, ELECTRONIC DEVICE, STORAGE MEDIUM, AND PROGRAM PRODUCT

(71) Applicant: Tencent Technology (Shenzhen) Company Limited, Shenzhen (CN)

(72) Inventor: Hui Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 313 days.

(21) Appl. No.: 18/424,507

(22) Filed: Jan. 26, 2024

(65) Prior Publication Data

US 2024/0193790 A1 Jun. 13, 2024

Related U.S. Application Data

(63) Continuation of application No. PCT/CN2023/102825, filed on Jun. 27, 2023.

(30) Foreign Application Priority Data

Aug. 11, 2022 (CN) ......................... 202210958643.1

(51) Int. Cl.
*G06T 7/20* (2017.01)
*G06V 10/74* (2022.01)
*G06V 40/16* (2022.01)

(52) U.S. Cl.
CPC .............. *G06T 7/20* (2013.01); *G06V 10/761* (2022.01); *G06V 40/161* (2022.01); *G06V 40/168* (2022.01); *G06T 2207/30241* (2013.01)

(58) Field of Classification Search
CPC ............. G06T 7/20; G06T 2207/30241; G06T 2207/30196; G06T 2207/30201;
(Continued)

(56) References Cited

U.S. PATENT DOCUMENTS 6,795,567 B1 * 9/2004 Cham ..................... G06T 7/246
382/103
9,996,939 B2 * 6/2018 Huang .................... G06T 7/292
(Continued)

FOREIGN PATENT DOCUMENTS

CN 108509896 A 9/2018
CN 112199543 A 1/2021
CN 115098732 A 9/2022

OTHER PUBLICATIONS

K. Kim, Z. Yang, I. Masi, R. Nevatia and G. Medioni, "Face and Body Association for Video-Based Face Recognition," 2018 IEEE Winter Conference on Applications of Computer Vision (WACV), Lake Tahoe, NV, USA, 2018, pp. 39-48, doi: 10.1109/WACV.2018.00011. (Year: 2018).*

(Continued)

*Primary Examiner* — Utpal D Shah
*Assistant Examiner* — Jack Peter Kraynak
(74) *Attorney, Agent, or Firm* — Morgan, Lewis & Bockius LLP

(57) ABSTRACT

This application provides a data processing method performed by an electronic device to improve accuracy of image retrieval. The method includes: respectively performing face detection on at least one reference video frame included in a reference video based on a specified target object type, to obtain at least one face image; extracting a face feature from the face image; respectively performing limb detection on the reference video frame based on the target object type, to obtain at least one limb image; extracting a limb feature from the limb image; and obtaining at least one reference motion trajectory based on each face image and each limb image, each reference motion trajectory comprising a plurality of limb features and a plurality of face features of a target object.

20 Claims, 15 Drawing Sheets

(58) Field of Classification Search
CPC .. G06V 40/168; G06V 10/761; G06V 40/161; G06V 40/169; G06V 40/20; G06V 40/23; G06V 40/25; G06V 40/28
See application file for complete search history.

(56) References Cited

U.S. PATENT DOCUMENTS

| | | | | |
|---|---|---|---|---|
| 11,048,919 B1 * | 6/2021 | Modolo | G06V 20/40 | |
| 11,227,388 B2 * | 1/2022 | Pang | G06T 5/73 | |
| 2013/0108177 A1 * | 5/2013 | Sukthankar | G06V 10/75 | 382/218 |
| 2013/0216094 A1 * | 8/2013 | DeLean | G06F 18/22 | 382/103 |
| 2016/0335502 A1 * | 11/2016 | Roshtkhari | G06V 20/52 | |
| 2017/0148174 A1 * | 5/2017 | Kim | H04N 23/90 | |

OTHER PUBLICATIONS

Xi Shen, L. Zhang, Z. Wang and Dagan Feng, "Spatial-temporal correlation for trajectory based action video retrieval," 2015 IEEE 17th International Workshop on Multimedia Signal Processing (MMSP), Xiamen, China, 2015, pp. 1-6, doi: 10.1109/MMSP.2015.7340811. (Year: 2015).*

Tencent Technology, ISR, PCT/CN2023/102825, Sep. 14, 2023, 2 pgs.

* cited by examiner

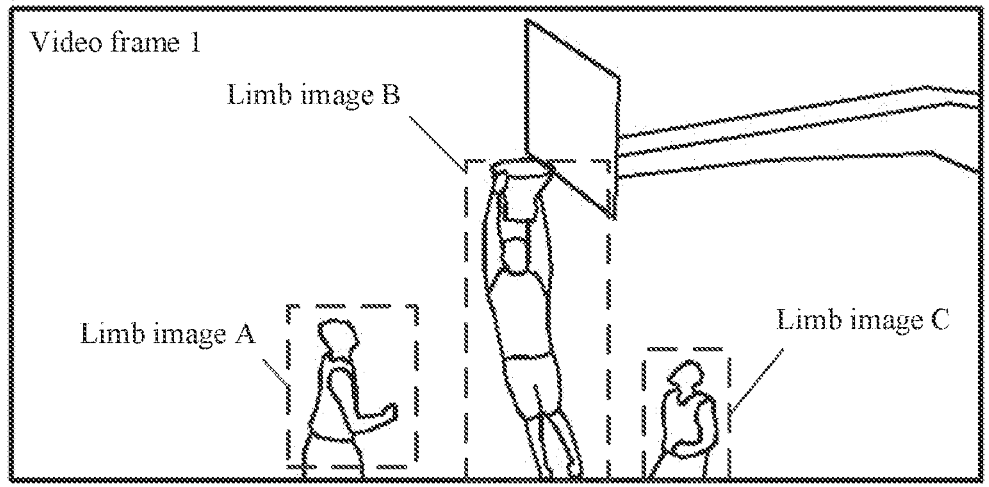
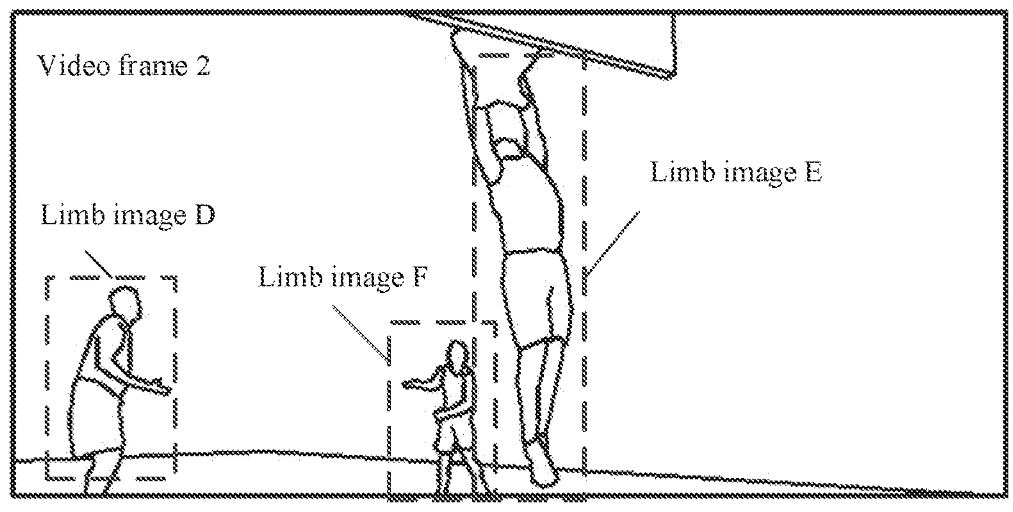
FIG. 7A
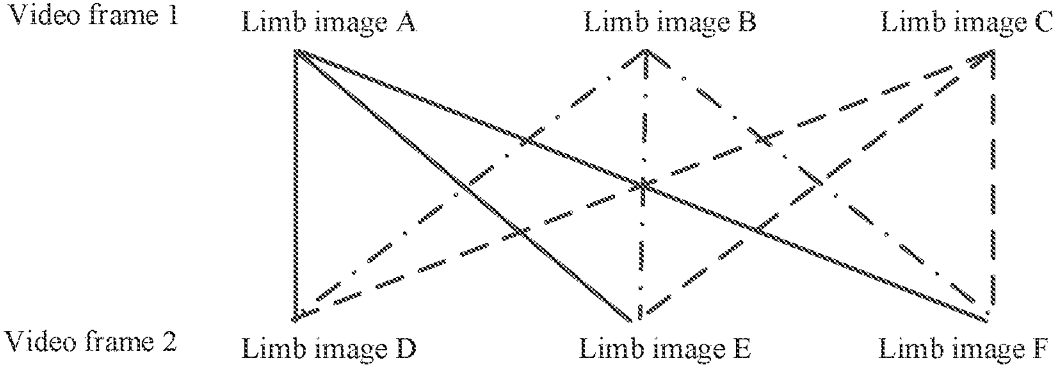
FIG. 7B

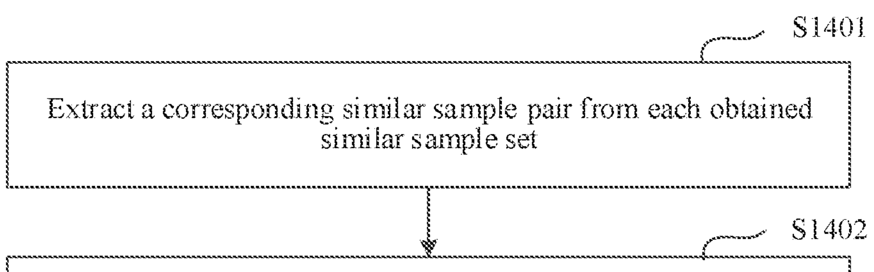

S1402

Perform the following operations for each of the similar sample pairs:
using one sample included in one similar sample pair as a reference sample, respectively extracting one corresponding another sample from other similar sample pairs, and calculating a second sample similarity between each of the other extracted samples and the reference sample; and
determining at least one target sample from the other samples based on the calculated second sample similarities, and obtaining at least one piece of training data based on the at least one target sample and the one similar sample pair

FIG. 14

Similar sample set 1 (sample data 1a, 1b, 1c, ...) Similar sample pair 1 (1a, 1b)
Similar sample set 2 (sample data 2a, 2b, 2c, ...) Extract Similar sample pair 2 (2a, 2b)
...
Similar sample set bs (sample data bsa, bsb, bsc, ...) Similar sample pair bs (bsa, bsb)

FIG. 15

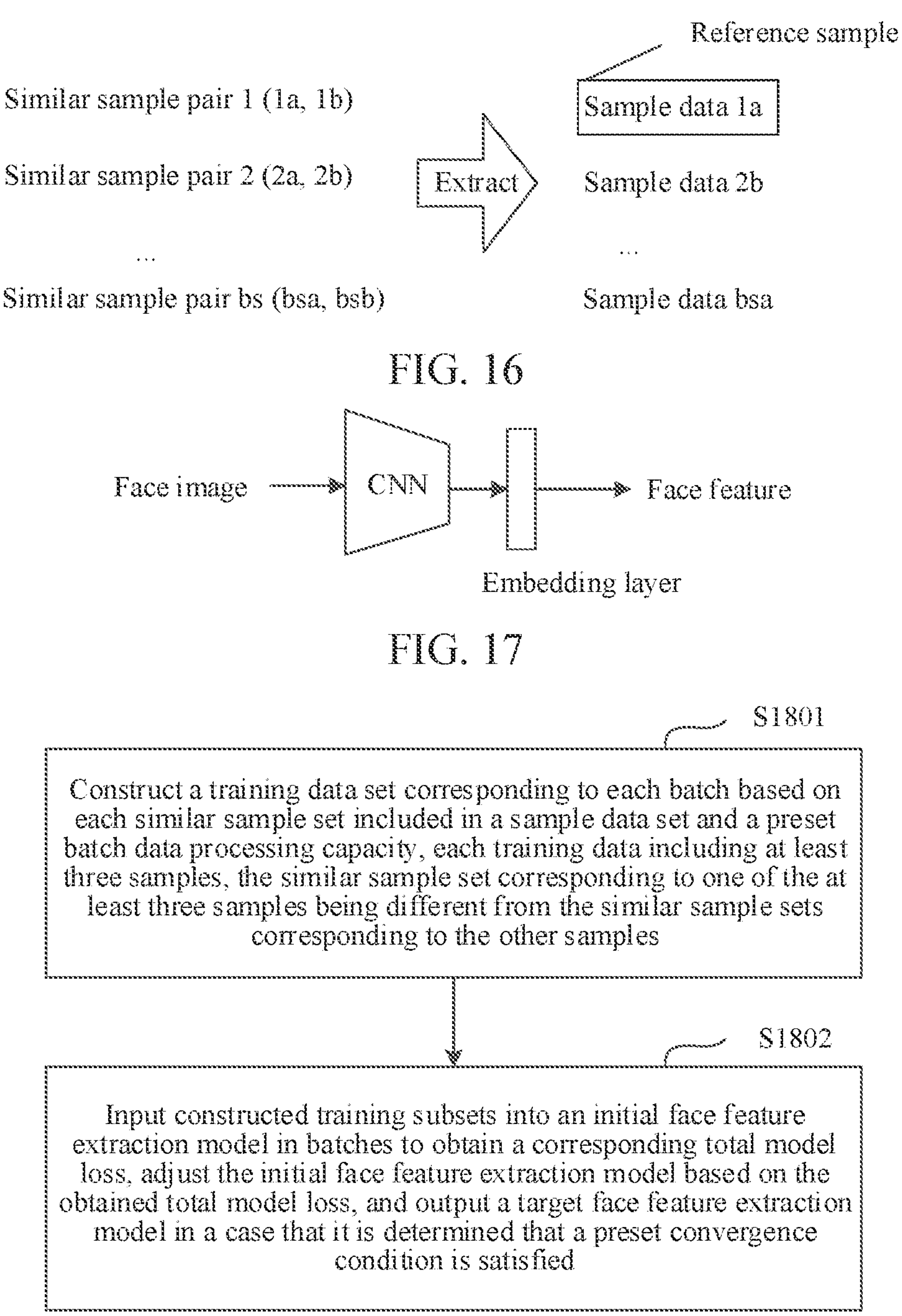
Reference sample
Similar sample pair 1 (1a, 1b)
Similar sample pair 2 (2a, 2b)
...
Similar sample pair bs (bsa, bsb)
Extract
Sample data 1a
Sample data 2b
...
Sample data bsa
FIG. 16
Face image
CNN
Embedding layer
Face feature
FIG. 17
S1801
Construct a training data set corresponding to each batch based on each similar sample set included in a sample data set and a preset batch data processing capacity, each training data including at least three samples, the similar sample set corresponding to one of the at least three samples being different from the similar sample sets corresponding to the other samples
S1802
Input constructed training subsets into an initial face feature extraction model in batches to obtain a corresponding total model loss, adjust the initial face feature extraction model based on the obtained total model loss, and output a target face feature extraction model in a case that it is determined that a preset convergence condition is satisfied
FIG. 18

DATA PROCESSING METHOD AND APPARATUS, ELECTRONIC DEVICE, STORAGE MEDIUM, AND PROGRAM PRODUCT

CROSS-REFERENCE TO RELATED APPLICATIONS

This application is a continuation application of PCT Patent Application No. PCT/CN2023/102825, entitled "DATA PROCESSING METHOD AND APPARATUS, ELECTRONIC DEVICE, STORAGE MEDIUM, AND PROGRAM PRODUCT" filed on Jun. 27, 2023, which is based on and claims priority to Chinese Patent Application No. 202210958643.1, entitled "DATA PROCESSING METHOD AND APPARATUS, ELECTRONIC DEVICE, STORAGE MEDIUM, AND PROGRAM PRODUCT" filed on Aug. 11, 2022, all of which is incorporated herein by reference in its entirety.

FIELD OF THE TECHNOLOGY

This application relates to the field of computer technologies, and in particular, to a data processing method and apparatus, an electronic device, a storage medium, and a program product.

BACKGROUND OF THE DISCLOSURE

With the rapid development of Internet technology, the application scope of image retrieval technology is increasingly more extensive. The image retrieval technology is to search candidate images included in an image library for a target image similar to a to-be-retrieved image.

In the related art, corresponding global image features are usually extracted respectively for each candidate image and the to-be-retrieved image, then the global image feature corresponding to each candidate image is matched with the global image feature of the to-be-retrieved image, and the target image is determined based on the matching result.

However, because the global image features describe more global information, the global features of the candidate images are also similar when a background environment between the candidate images is similar and the clothing of the target object included in each candidate image is similar. Therefore, it is difficult to reflect a difference between the candidate images and difficult to ensure the accuracy of image retrieval.

SUMMARY

Embodiments of this application provide a data processing method and apparatus, an electronic device, a storage medium, and a program product, so as to improve accuracy of image retrieval.

According to a first aspect, an embodiment of this application provides a data processing method, performed by an electronic device, the method including:

- respectively performing face detection and limb detection on at least one reference video frame comprised in a reference video based on a specified target object type, to obtain at least one face image and at least one limb image;
- respectively extracting a face feature and a limb feature from the at least one face image and the at least one limb image; and
- obtaining at least one reference motion trajectory based on each face image and each limb image, each reference motion trajectory comprising a plurality of limb features and a plurality of face features of a target object.

According to a second aspect, an embodiment of this application provides an electronic device, including a processor and a memory, the memory having a computer program stored therein, the computer program, when executed by the processor, causing the electronic device to perform the operations of the foregoing data processing method.

According to a third aspect, an embodiment of this application provides a non-transitory computer-readable storage medium, including a computer program, the computer program, when executed by an electronic device, causing the electronic device to perform the operations of the foregoing data processing method.

According to the embodiments of this application, through mining of the corresponding face features and limb features of the face image and the limb image in a video, a difference between the images may be expressed more accurately by using the face features and the limb features compared with the scheme of image retrieval based on global video representation of the related art, thereby improving the accuracy of image retrieval. In addition, compared with extracting one feature per frame in the related art, in the embodiments of this application, long video information may be extracted more accurately by obtaining the reference motion trajectory including limb features and face features, thereby achieving a better image retrieval effect.

Other features and advantages of the embodiments of this application are to be described subsequently in the specification, and partly become apparent from the specification, or may be learned through implementation of this application. Objectives and other advantages of the embodiments of this application may be implemented and obtained by using structures particularly pointed out in the written specification, claims, and accompanying drawings.

BRIEF DESCRIPTION OF THE DRAWINGS

The accompanying drawings described herein are used to provide a further understanding of this application, and constitute a part of this application. Exemplary embodiments of this application and descriptions thereof are used to explain this application, and do not constitute any inappropriate limitation on this application. In the accompanying drawings:

FIG. 7A is a schematic diagram of a reference video according to an embodiment of this application.

FIG. 7B is a schematic diagram of a limb image set according to an embodiment of this application.

FIG. 10B is a schematic diagram of logic of calculating a limb similarity according to an embodiment of this application.

FIG. 14 is a schematic flowchart of constructing a training dataset according to an embodiment of this application.

FIG. 15 is a schematic diagram of logic of extracting similar sample pairs according to an embodiment of this application.

FIG. 16 is a schematic diagram of logic of calculating a second similarity according to an embodiment of this application.

FIG. 17 is a schematic structural diagram of a face feature extraction model according to an embodiment of this application.

FIG. 18 is a schematic flowchart of a training process of a face feature extraction model according to an embodiment of this application.

DESCRIPTION OF EMBODIMENTS

Figures 1, 2:
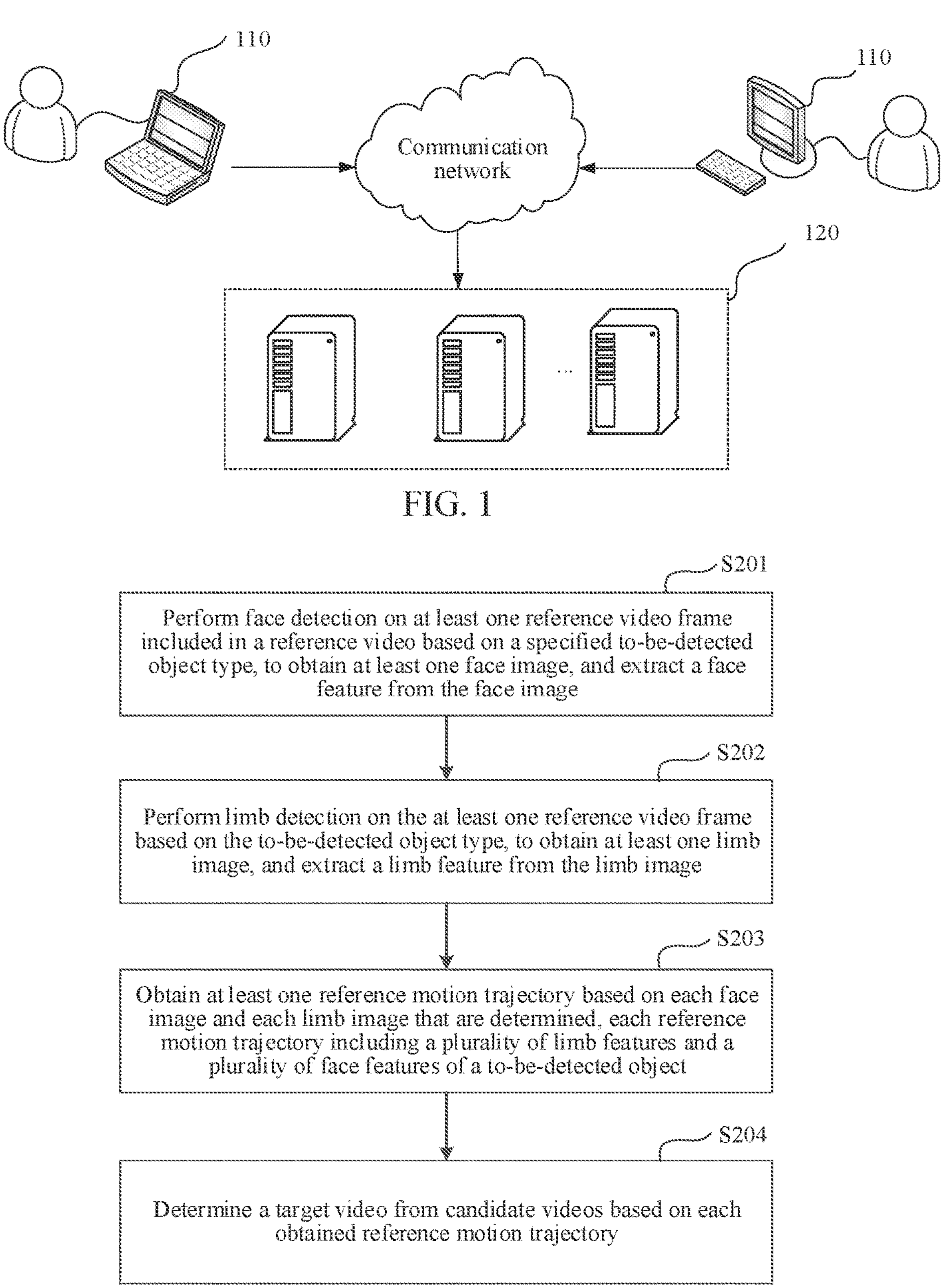
FIG. 1 is a schematic diagram of an application scene according to an embodiment of this application.
FIG. 2 is a schematic flowchart of a data processing method according to an embodiment of this application.

To make objectives, technical solutions, and advantages of embodiments of this application clearer, the technical solutions of this application are to be clearly and completely described below with reference to the accompanying drawings in the embodiments of this application. Apparently, the embodiments to be described are a part rather than all of the embodiments of the technical solutions of this application. All other embodiments obtained by a person of ordinary skill in the art based on the embodiments described in the document of this application without making creative efforts fall within the protection scope of the technical solutions of this application.

In an example application of the relevant data collection and processing in the embodiments of this application, the informed consent or individual consent of a personal information subject needs to be obtained in strict accordance with the requirements of relevant national laws and regulations, and the subsequent data use and processing behavior is carried out within the authorized scope of laws and regulations and the personal information subject.

First, some terms involved in the embodiments of this application are explained as follows.

Image similarity representation: It is an image embedding from deep learning features, which mainly describes some representation information such as full-image image texture and feature layouts (including shapes of objects in the image and a spatial relationship), and may be used to distinguish two different images.

Semantic image representation: It is an image embedding from semantic learning, which mainly describes representation of parts with some specified semantic content in an image. For example, if an embedding is used to describe a dog, a feature of a position of the dog in the image is extracted as image representation.

Image embedding: It is used to describe features of image information, the foregoing similarity representation and semantic representation are both an image embedding, and a form of an embedding is not limited to floating-point features, or may be an image representation composed of binary feature vectors, that is, depth hash features. Embeddings and features mentioned below all refer to binary deep hash features unless otherwise specified.

Image deduplication retrieval: A task of confirming whether two images are the same, or a task of subjecting an image to certain image transformations to obtain another image is referred to as image deduplication recognition, and a task of searching an image library to determine whether a query image is a duplicate of an image in the library is referred to as image deduplication retrieval. In the related art, image retrieval includes extracting an embedding of a sample in an image library, calculating a distance (for example, a Euclidean distance) between an embedding of a query and the embedding of the sample in the image library, and obtaining and recalling some samples with a shortest distance.

Video deduplication retrieval: For mass video storage, to save storage space, or to determine whether a video is the same or similar to a video stored in a video library, duplicate videos or video segments need to be excluded or recognized. Therefore, video deduplication recognition is needed to confirm whether two videos are the same or similar, or confirm whether two videos have the same or similar video segments. Video deduplication retrieval includes searching a video library to determine whether a video that is a duplicate of a query video exists or whether a video having a video clip that is a duplicate of a video clip of the query video exists.

Artificial intelligence (AI) involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning.

Machine learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

A reference motion trajectory is formed by arranging features, based on an order in which a plurality of video frames are played, of a series of video frames in which the same target object occurs in a video. In a plurality of videos, the target object is a person by way of example, and types of features may include at least one of face features and limb features of the target object occurring in the video frame.

A reference video is a video used as a reference for video retrieval. The video includes at least one object (that is, a target object, such as a person), which is used for comparison with another video to determine whether another video includes the same object.

A candidate video is a video that needs to be searched to determine whether the video includes the same object as the reference video.

In the embodiments of the application, a face feature extraction model may be used to obtain face features corresponding to a face image during face detection of the face image, and a limb feature extraction model may be used to obtain limb features corresponding to a limb image during limb detection of the limb image. For the model training and application process of the face feature extraction model and the limb feature extraction model, reference is made to the following.

With the rapid development of Internet technology, the application scope of image retrieval technology is increasingly more extensive. The image retrieval technology is to search candidate images included in an image library for a target image similar to a to-be-retrieved image.

In the related art, corresponding global image features are usually extracted respectively for each candidate image and the to-be-retrieved image, then the global image feature corresponding to each candidate image is matched with the global image feature of the to-be-retrieved image, and the target image is determined based on the matching result.

However, because the global image features describe more global information, the global features of the candidate images are also similar when a background environment between the candidate images is similar and the clothing of the target object included in each candidate image is similar. Therefore, it is difficult to reflect a difference between the candidate images and difficult to ensure the accuracy of image retrieval.

In the embodiments of the application, face detection is respectively performed on a plurality of reference video frames included in a reference video based on a specified target object type, and at least one face image and a corresponding face feature included in each of the plurality of reference video frames are determined. Limb detection is respectively performed on the plurality of reference video frames based on the target object type, to obtain at least one limb image and a corresponding limb feature included in each of the plurality of reference video frames. At least one reference motion trajectory corresponding to the reference video is obtained based on each face image and each limb image that are determined, and an image retrieval result is obtained based on the obtained reference motion trajectory. Each reference motion trajectory includes a plurality of limb features and a plurality of face features of a target object.

In this way, through mining of the face images and the limb images in the video, a difference between the images may be expressed more accurately by using the face features and the limb features compared with global video representation of the related art, thereby improving the accuracy of image retrieval. In addition, compared with extracting one feature per frame in the related art, in this application, long video information may be extracted more accurately by obtaining the reference motion trajectory including limb features and face features, thereby achieving a better image retrieval effect.

FIG. 1 is a schematic diagram of an application scene according to an embodiment of this application. The application scene includes at least a terminal device 110 and a server 120. One or more terminal devices 110 may be provided, and one or more servers 120 may also be provided. A quantity of terminal devices 110 and a quantity of servers 120 are not specifically limited in this application.

In this embodiment of this application, the terminal device 110 may be a smart phone, a tablet computer, a notebook computer, a desktop computer, a smart speaker, a smart watch, an Internet of things device, an intelligent household appliance, an on-board terminal, or the like, which is not limited thereto.

The server 120 may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), and a big data and artificial intelligence platform. The terminal device 110 and the server 120 may be directly or indirectly connected in a manner of wired or wireless communication, which is not limited herein in the embodiments of this application.

The data processing method in this embodiment of this application may be performed by the terminal device, or may be performed by the server, or may be performed by both the terminal device and the server.

FIG. 2 is a schematic flowchart of a data processing method according to an embodiment of this application. The method is applied to an electronic device, and the electronic device may be a terminal device or a server, and is configured to detect a target video including a target object type from a plurality of candidate videos. The target object type may be an object such as a person and an animal having a face. For example, the target object type is a person, a dog, a cat, and the like. If a target video including a person and a target video including an animal need to be detected from the plurality of candidate videos, the target object types need to be successively specified as a person and an animal, and the following S201 to S204 are performed for each specified target object type.

For a target object of a specified target object type, the specific process of detecting an object including the corresponding target object from the plurality of candidate videos is as follows.

S201: Respectively perform face detection on at least one reference video frame included in a reference video based on a specified target object type, to obtain at least one face image, and extract a face feature from the face image.

In some embodiments, the face detection is performed on a reference video frame included in the reference video (the reference video frame may be a video frame including a face image calibrated in advance) based on the specified target object type, to obtain at least one face image included in the reference video frame. For example, a face image of an object 1, or respective face images of a plurality of (that is, at least two) objects such as the object 1 and an object 2 are obtained. The face feature is extracted from each face image.

In some other embodiments, the face detection is respectively performed on the plurality of reference video frames included in the reference video based on the specified target object type, to obtain at least one face image included in each of the plurality of reference video frames, and a face feature is extracted from each face image. As an example, a corresponding face image may be detected from each reference video frame. As another example, a corresponding face image may be detected from some of the plurality of reference video frames. To be specific, it is not forced to detect a corresponding face image from each reference video frame. S202: Perform limb detection on the at least one reference video frame based on the target object type, to obtain at least one limb image, and extract a limb feature from the limb image.

In some embodiments, carrying on with the foregoing case of performing the face detection on one reference video frame included in the reference video, in S202, the limb detection is performed on the reference video frame based on the target object type, to obtain at least one limb image included in the reference video frame. For example, a limb image of an object 1, or respective limb images of a plurality of (that is, at least two) objects such as the object 1 and an object 2 are obtained. A corresponding limb feature is extracted from each limb image.

In some other embodiments, carrying on with the foregoing case of performing face detection on the plurality of reference video frames included in the reference video, in S202, the limb detection is respectively performed on the plurality of reference video frames based on the target object type, to obtain at least one limb image included in each of the plurality of reference video frames, and a corresponding limb feature is extracted from each limb image.

As an example, a corresponding limb image may be detected from each reference video frame. As another example, a corresponding limb image may be detected from some of the plurality of reference video frames. To be specific, it is not mandatory that a corresponding face image is detected from each reference video frame.

S203: Obtain at least one reference motion trajectory based on each face image and each limb image that are determined, each reference motion trajectory including a plurality of limb features and a plurality of face features of a target object.

The reference motion trajectory corresponds to the reference video. To be specific, each reference motion trajectory includes a plurality of limb features and a plurality of face features of a target object occurring in the reference video, and each face image and each limb image belong to the target object corresponding to the same target object type, for example, both belong to human or animals. When a plurality of reference motion trajectories are provided, as an example, different reference motion trajectories may belong to different persons, or some of the plurality of reference motion trajectories may belong to the same person.

S204: Determine a target video from the candidate videos based on the obtained reference motion trajectories.

In some embodiments, the target video is determined from the candidate videos based on each obtained reference motion trajectory and based on a candidate motion trajectory corresponding to each of the candidate videos.

The manner of determining the candidate motion trajectory of the candidate video is similar to the specific implementation of obtaining the reference motion trajectory based on the reference video described below. face detection is performed on at least one candidate video frame included in a candidate video based on a specified target object type, to obtain at least one face image, and a face feature is extracted from the face image. Limb detection is respectively performed on the candidate video frame based on the target object type, to obtain at least one limb image. A limb feature is extracted from the limb image. At least one candidate motion trajectory is obtained based on each face image and each limb image, each candidate motion trajectory including a plurality of limb features and a plurality of face features of a target object.

In some embodiments, that the at least one candidate motion trajectory is obtained based on each face image and each limb image is implemented in the following manner: determining a face-limb association relationship between each face image and each limb image based on each face image and each limb image that are determined; and obtaining at least one candidate motion trajectory corresponding to the candidate video based on the face-limb association relationship and based on a first similarity between the limb features corresponding to the limb images.

In some embodiments, the determining a face-limb association relationship between each face image and each limb image based on each face image and each limb image that are determined is implemented in the following manner: respectively performing the following operations for each of a plurality of candidate video frames: calculating an image coincidence proportion between at least one limb image included in the candidate video frame and at least one face image included in the candidate video frame; and associating the face image with the limb image in the at least one limb image and the at least one face image having the corresponding image coincidence proportion not less than a coincidence proportion threshold.

In some embodiments, the obtaining at least one candidate motion trajectory corresponding to the candidate video based on the face-limb association relationship and based on a first similarity between the limb features corresponding to the limb images is implemented in the following manner: calculating the first similarity between the limb features corresponding to the limb images, and determining a limb association relationship between a preceding frame and a succeeding frame corresponding to the candidate video based on the calculated first similarity; and obtaining the at least one candidate motion trajectory corresponding to the candidate video based on the face-limb association relationship and the limb association relationship between a preceding frame and a succeeding frame.

In some embodiments, the calculating the first similarity between the limb features corresponding to the limb images, and determining a limb association relationship between a preceding frame and a succeeding frame corresponding to the candidate video based on the calculated first similarity is implemented in the following manner: successively performing the following operations based on a playback order of the plurality of candidate video frames: obtaining limb image sets, each of the limb image sets including: a first limb image in a current candidate video frame and a second limb image in a next candidate video frame; calculating a first similarity corresponding to each limb image set, each first similarity being used for representing a similarity between the first limb image and the second limb image included in the limb image set; and screening out, from the limb image sets, a target limb image set having the corresponding first similarity not less than a first similarity threshold, and determining the limb association relationship between a preceding frame and a succeeding frame based on each screened target limb image set.

In some embodiments, after the at least one candidate motion trajectory is obtained based on each face image and each limb image, the method further includes: determining a second similarity among a plurality of face signs included in each of a plurality of candidate motion trajectories when the plurality of candidate motion trajectories exist; and determining a trajectory association relationship among the plurality of candidate motion trajectories based on each determined second similarity.

In some embodiments, the determining a trajectory association relationship among the plurality of candidate motion trajectories based on each determined second similarity is implemented in the following manner: performing the following operations for any two candidate motion trajectories included in the plurality of candidate motion trajectories: calculating second similarities between a plurality of face features included in one candidate motion trajectory and a plurality of face features included in another candidate motion trajectory, and screening out, from the calculated second similarities, a target second similarity not less than a second similarity threshold; and storing a trajectory association relationship between the any two candidate motion trajectories when it is determined based on each screened target second similarity that the any two candidate motion trajectories belong to a same target object.

It is to be pointed out that the target object type specified in obtaining the candidate motion trajectory is the same as the target object type specified in obtaining the reference motion trajectory above, for example, both are people or animals.

In this embodiment of this application, the obtained reference motion trajectories may be used for services such as video deduplication recognition and video deduplication retrieval, or may be used for services such as video outfit recommendation and video editing. The target video having a corresponding candidate motion trajectory matching the reference video refers to a video that satisfies a corresponding service requirement.

In this embodiment of this application, through mining of the face images and the limb images in the video, a difference between the images may be expressed more accurately by using the face features and the limb features compared with global video representation of the related art, thereby improving the accuracy of image retrieval. In addition, compared with extracting one feature per frame in the related art, in this application, long video information may be extracted more accurately by obtaining the reference motion trajectory including limb features and face features, thereby achieving a better image retrieval effect.

In some embodiments, in S201, the reference video frame involved may be any frame in the reference video, and in the process of respectively performing face detection on the plurality of reference video frames included in the reference video based on the specified target object type and determining at least one face image included in each of the plurality of reference video frames, the face detection may be performed by using, but not limited to, a face detection model trained based on an open-source dataset COCO, so as to extract the face image from the reference video frame by using the face detection model. For example, the reference video frame is inputted into the trained face detection model, a position of a surrounding box outputted by the face detection model is obtained, and matting is performed on the reference video frame based on the position of the surrounding box to obtain the face image in the reference video frame.

An image sample of the face detection model includes the face image of the specified target object type, and label data is a position of the face image in the image sample (for example, diagonal coordinates of a rectangular surrounding box of the face image). Supervised training is performed on the face detection model by using the image sample and the label data and based on a back propagation algorithm. For different target object types, corresponding face detection models need to be trained separately.

The foregoing face detection models may be you only look once (YOLO), faster region-based convolutional neural network (Faster R-CNN), region-based fully convolutional network (R-FCN), single shot multibox detector (SSD), and the like.

In some embodiments, each face image may be inputted into the trained target face feature extraction model to obtain a corresponding face feature. Specifically, at least one face image included in each of the plurality of reference video frames is inputted into a trained target face feature extraction model to obtain the corresponding face feature. For the training process of the target face feature extraction model, reference is made to the following.

As an example, the face feature extraction model may be a multi-layer convolutional neural network, and a convolutional feature vector of the limb image is extracted by using the multi-layer convolutional neural network to serve as the face feature.

Figure 3:
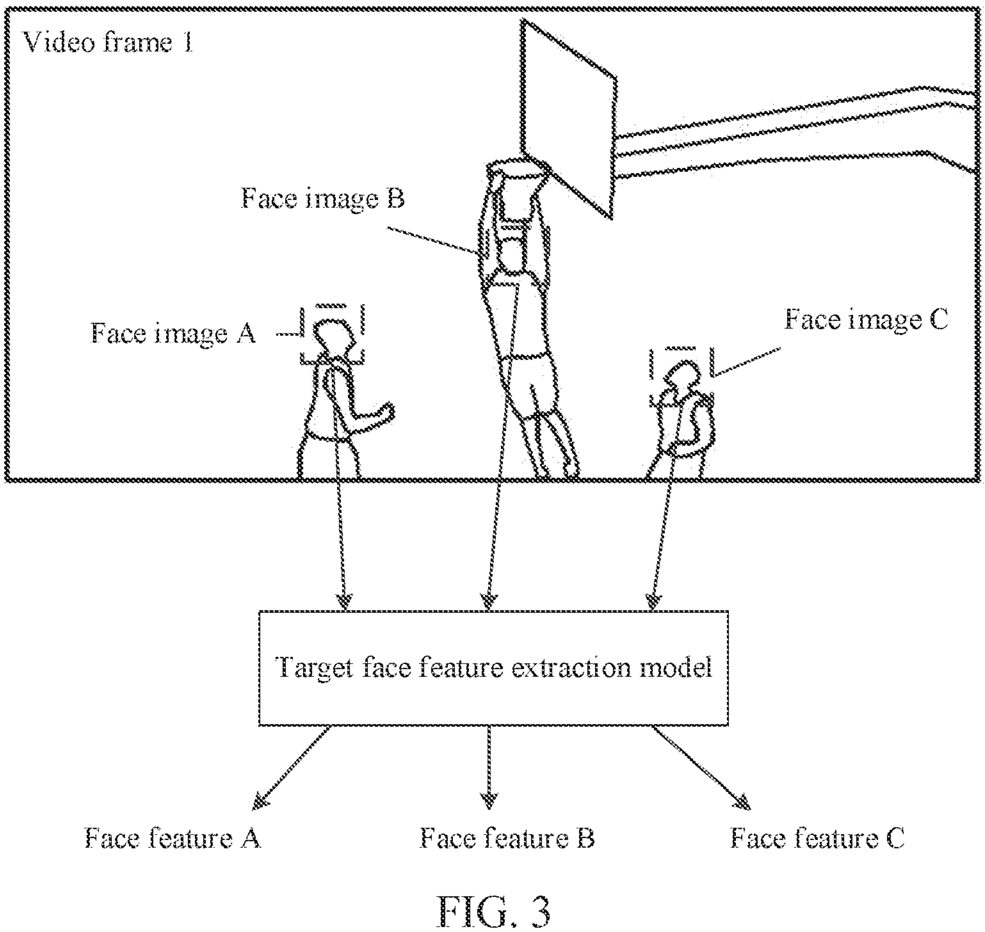
FIG. 3 is a schematic diagram of logic of obtaining a face feature according to an embodiment of this application.

The following uses an example in which the reference video frame is a video frame 1. As shown in FIG. 3, the video frame 1 includes a face image A, a face image B, and a face image C. The face image A is inputted into the trained target face feature extraction model to obtain a face feature A, the face image B is inputted into the trained target face feature extraction model to obtain a face feature B, and the face image C is inputted into the trained target face feature extraction model to obtain a face feature C.

In some embodiments, the process of respectively performing limb detection on the plurality of reference video frames based on the target object type, and determining at least one limb image included in each of the plurality of reference video frames is similar to S201. Based on the target object type, in the process of respectively performing limb detection on the plurality of reference video frames based on the target object type, and determining at least one limb image included in each of the plurality of reference video frames, models such as YOLO and SSD may be used for limb detection to obtain the limb image. The limb image includes a face, a trunk, and limbs.

An image sample of the limb detection model includes the limb image of the specified target object type, and label data is a position of the limb image in the image sample (for example, diagonal coordinates of a rectangular surrounding box of the face image). Supervised training is performed on the limb detection model by using the image sample and the label data and based on a back propagation algorithm. For different target object types, corresponding limb detection models need to be trained separately.

In some embodiments, each limb image may be inputted into the trained target limb feature extraction model to obtain a corresponding limb feature. Specifically, at least one limb image included in each of the plurality of reference video frames is inputted into a trained target limb feature extraction model to obtain the corresponding limb feature. The training process of the target limb feature extraction model is similar to the training process of the target face feature extraction model. For details, reference is made to the following.

As an example, the target limb extraction model may be a multi-layer convolutional neural network, and a convolutional feature vector of the limb image is extracted by using the multi-layer convolutional neural network to serve as the limb feature.

Figure 4:
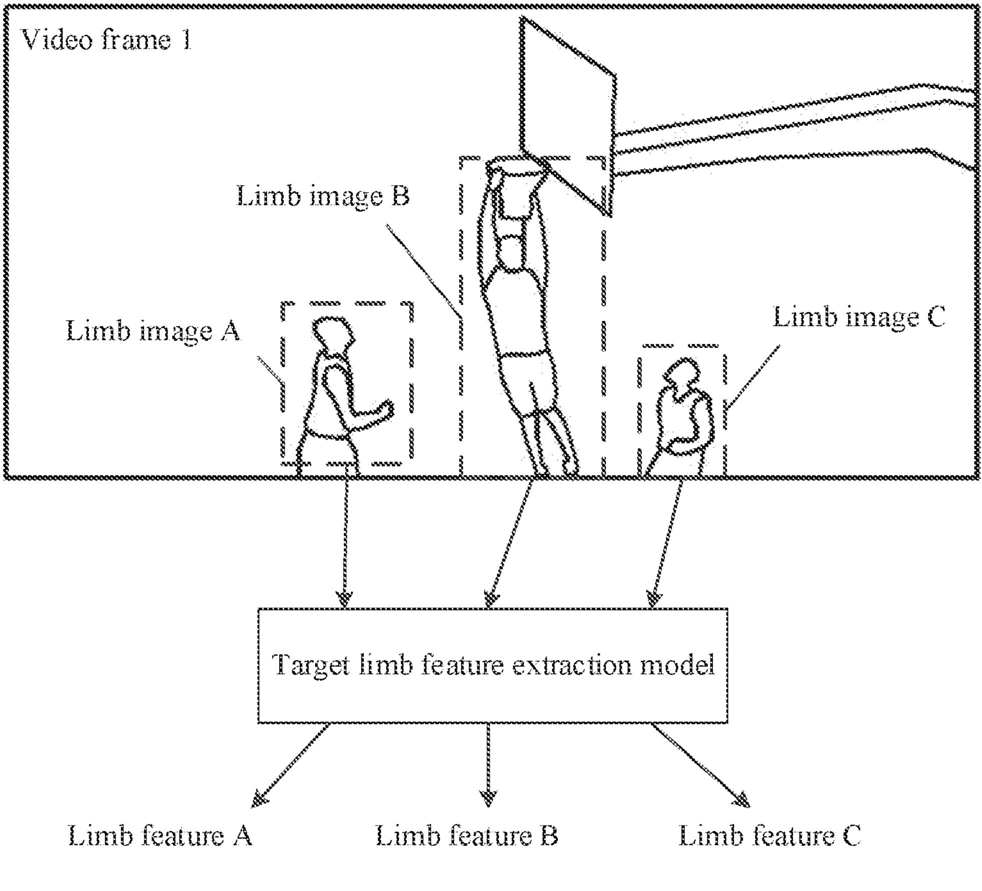
FIG. 4 is a schematic diagram of logic of obtaining a limb feature according to an embodiment of this application.

The following still uses an example in which the reference video frame is the video frame 1. As shown in FIG. 4, the video frame 1 includes a limb image A, a limb image B, and a limb image C. The limb image A is inputted into the trained target limb feature extraction model to obtain a limb feature A, the limb image B is inputted into the trained target limb feature extraction model to obtain a limb feature B, and the limb image C is inputted into the trained target limb feature extraction model to obtain a limb feature C.

Figure 5:
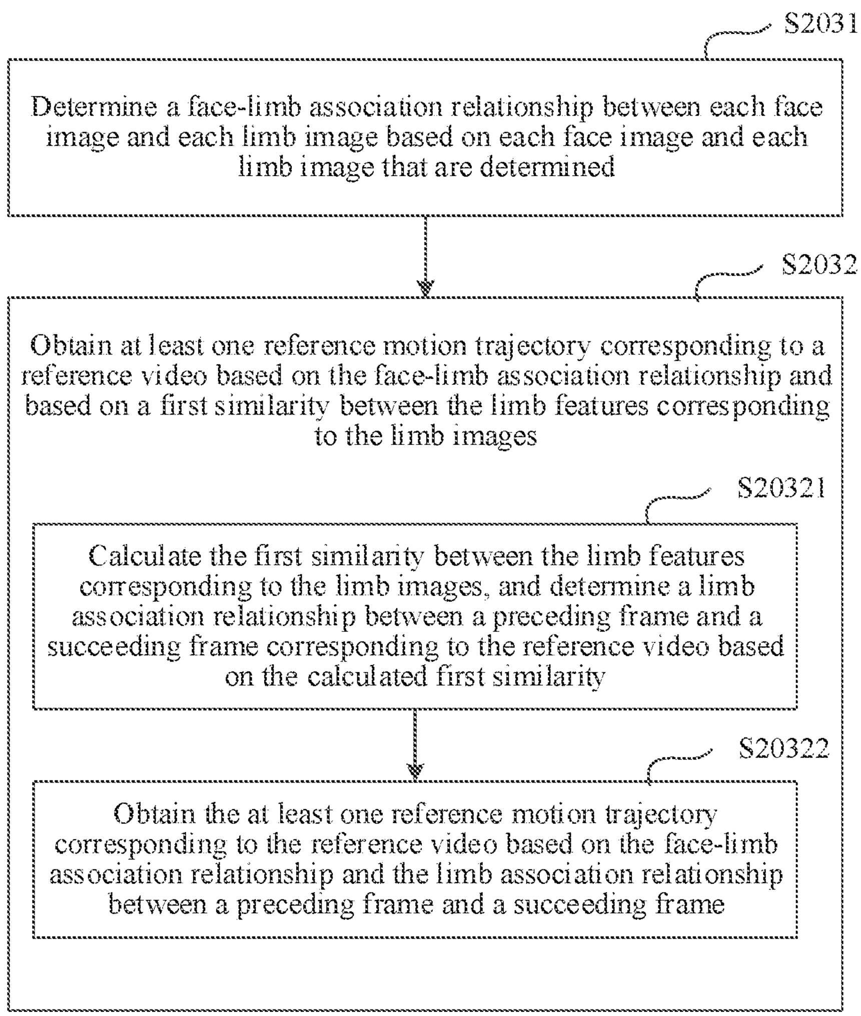
FIG. 5 is a schematic flowchart of a method for obtaining a reference motion trajectory according to an embodiment of this application.

In some embodiments, referring to FIG. 5, S203 may include but is not limited to the following steps:

S2031: Determine a face-limb association relationship between each face image and each limb image based on each face image and each limb image that are determined.

Specifically, in this embodiment of this application, the following operations are respectively performed for each of the plurality of reference video frames.

A reference video frame x is used as an example. The reference video frame x is any one of a plurality of reference data frames. An image coincidence proportion of at least one limb image included in the reference video frame x to at least one face image included in the reference video frame x is calculated, that is, an area proportion of a coincident part between the limb image and the face image in the limb image. The face image in at least one limb image and at least one face image having the corresponding image coincidence proportion not less than a preset coincidence proportion threshold is associated with the limb image. To be specific, the corresponding face-limb association relationship is formed.

Figure 6:
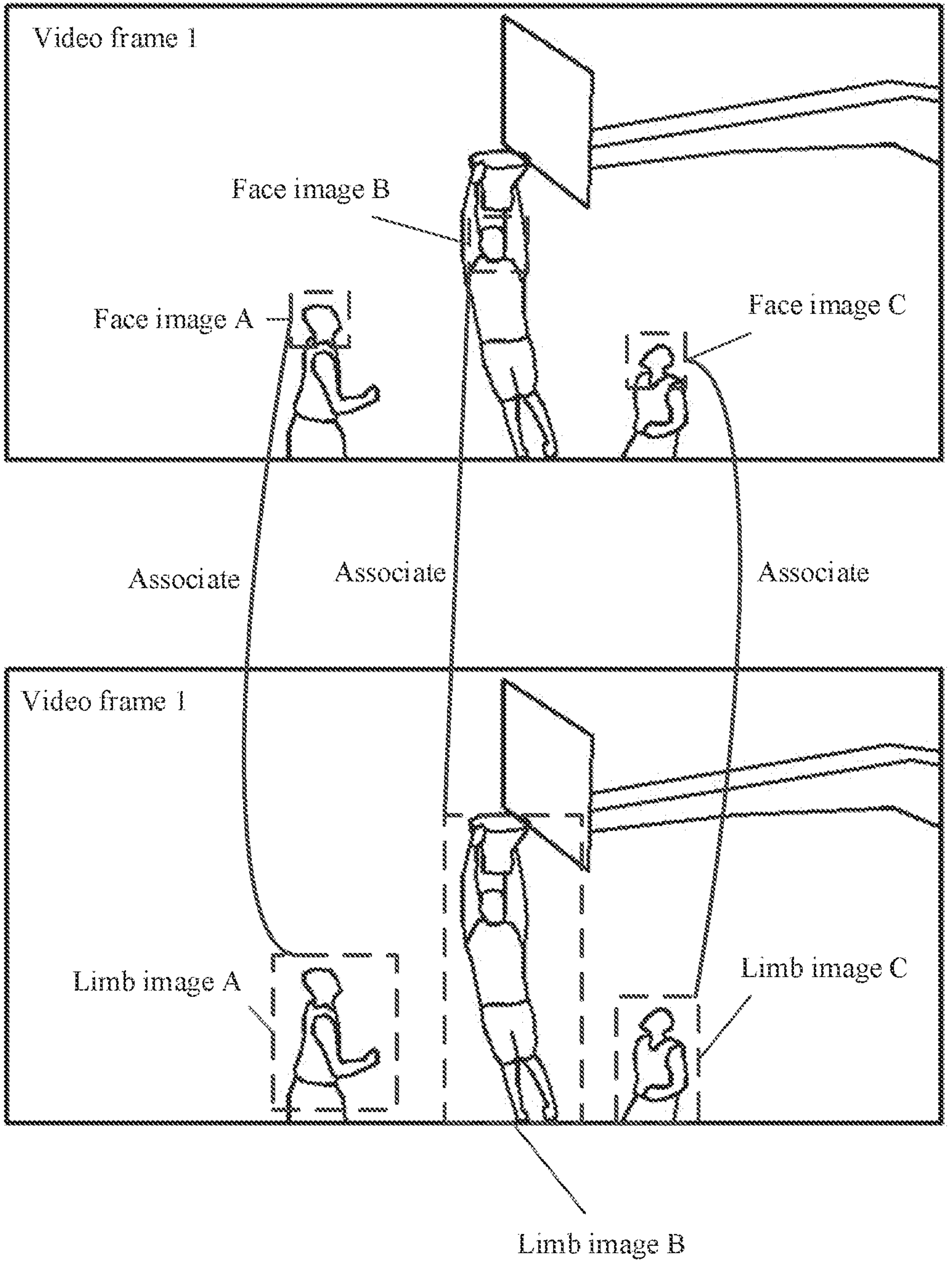
FIG. 6 is a schematic diagram of logic of associating a face image with a limb image according to an embodiment of this application.

The video frame 1 is still used as an example. Assuming that the preset coincidence proportion threshold is 60%, referring to FIG. 6, for the limb image A, the image coincidence proportions between the limb image A and the face image A, the face image B, and the face image C are calculated respectively. The image coincidence proportions between the limb image A and the face image A, the face image B, and the face image C are respectively 100%, 0, and 0. The limb image A is associated with the face image A. Similarly, the limb image B is associated with the face image B. To be specific, the corresponding face-limb association relationship is formed.

Through the foregoing implementation, the limb image is associated with the face image by using the image coincidence proportion, which ensures the accuracy of the association between the limb image and the face image to some extent, and improves the accuracy of a motion trajectory, thereby improving the image deduplication effect.

S2032: Obtain at least one reference motion trajectory corresponding to a reference video based on the face-limb association relationship and based on a first similarity between the limb features corresponding to the limb images.

Specifically, in this embodiment of this application, during performing of S2032, the following steps may be used.

S20321: Calculate the first similarity between the limb features corresponding to the limb images, and determine a limb association relationship between a preceding frame and a succeeding frame corresponding to the reference video based on the calculated first similarity.

Specifically, during performing of S20321, for the plurality of reference video frames, each reference video frame is successively used as a to-be-processed current reference video frame based on a video playback order, and the following operations are performed: obtaining limb image sets, each of the limb image sets including: a first limb image in a current reference video frame and a second limb image in a next reference video frame; calculating a first similarity corresponding to each limb image set, each first similarity being used for representing a corresponding similarity between the first limb image and the second limb image; and screening out, from the limb image sets, a target limb image sets having the corresponding first similarity not less than a first similarity threshold, and obtaining the limb association relationship between a preceding frame and a succeeding frame based on the screened target limb image sets. In other words, the first limb image and the second limb image in each screened target limb image set are determined as a preceding limb image and a succeeding limb image in a temporal sense.

It is to be pointed out that the foregoing next reference video frame refers to the reference video frame in which the limb image occurs for the first time after the current reference video frame based on the playback order.

In this embodiment of this application, the first similarity may be expressed by, but not limited to, a normalized L2 distance, with a value ranging from 0 to 1. The L2 distance is in the form of a vector. L2 normalization means dividing each value in the L2 distance by a square root of a sum of squares of all values. The L2 distance may be a Euclidean distance between a feature vector of the first limb image and a feature vector of the second limb image. A smaller L2 distance leads to a higher first similarity, and values of the L2 distance and the first similarity are negatively correlated. As an example, a value of the first similarity threshold is greater than 50%.

In this embodiment of this application, as a possible implementation, each limb image set may be directly obtained, and the first similarity corresponding to each limb image set may be calculated, so as to screen out, from each limb image set, a target limb image set having the corresponding first similarity not less than a first similarity threshold, and determine the limb association relationship between a preceding frame and a succeeding frame based on each screened target limb image set.

As another possible implementation, for the current reference video frame, the second limb image associated with each first limb image in the current reference video frame may be successively determined, and then the limb association relationship between a preceding frame and a succeeding frame may be determined based on the second limb image associated with each first limb image. Each first limb image and the associated second limb image are the screened target limb image sets. If a plurality of second limb images have a distance to the first limb image not less than the first similarity threshold, the second limb image having a largest first similarity to the first limb image is selected as the second limb image associated with the first limb image. The second limb image associated with the first limb image may be regarded as performance of an action of the limb in the first limb image in a next frame. In this case, features of the first limb image and the second limb image are used as two image features in the same motion trajectory.

For example, referring to FIG. 7A, it is assumed that the reference video includes a video frame 1 and a video frame 2. The video frame 1 includes a limb image A, a limb image B, and a limb image C, and the video frame 2 includes a limb image D, a limb image E, and a limb image F.

Referring to FIG. 7B, for the video frame 1, the current reference video frame is the video frame 1, and the next reference video frame is the video frame 2. For the limb image A, limb image sets are obtained. The limb image sets include a limb image set 1 (the limb image A and the limb image D), a limb image set 2 (the limb image A and the limb image E), and a limb image set 3 (the limb image A and the limb image F). Then a similarity between the limb image A and the limb image D is calculated as a first similarity 1 corresponding to the limb image set 1, a similarity between the limb image A and the limb image E is calculated as a first similarity 2 corresponding to the limb image set 2, and a similarity between the limb image A and the limb image F is calculated as a first similarity 3 corresponding to the limb image set 3. Assuming that the first similarity threshold is 90%, and the first similarity 1, the first similarity 2, and the first similarity 3 are respectively 90%, 80%, and 70%, it is determined that the target limb image set is the limb image set 1 from the limb image set 1, the limb image set 2, and the limb image set 3. To be specific, the limb image A and the limb image E belong to the same target object, and an association exists between the limb image A and the limb image D.

Figure 7C:
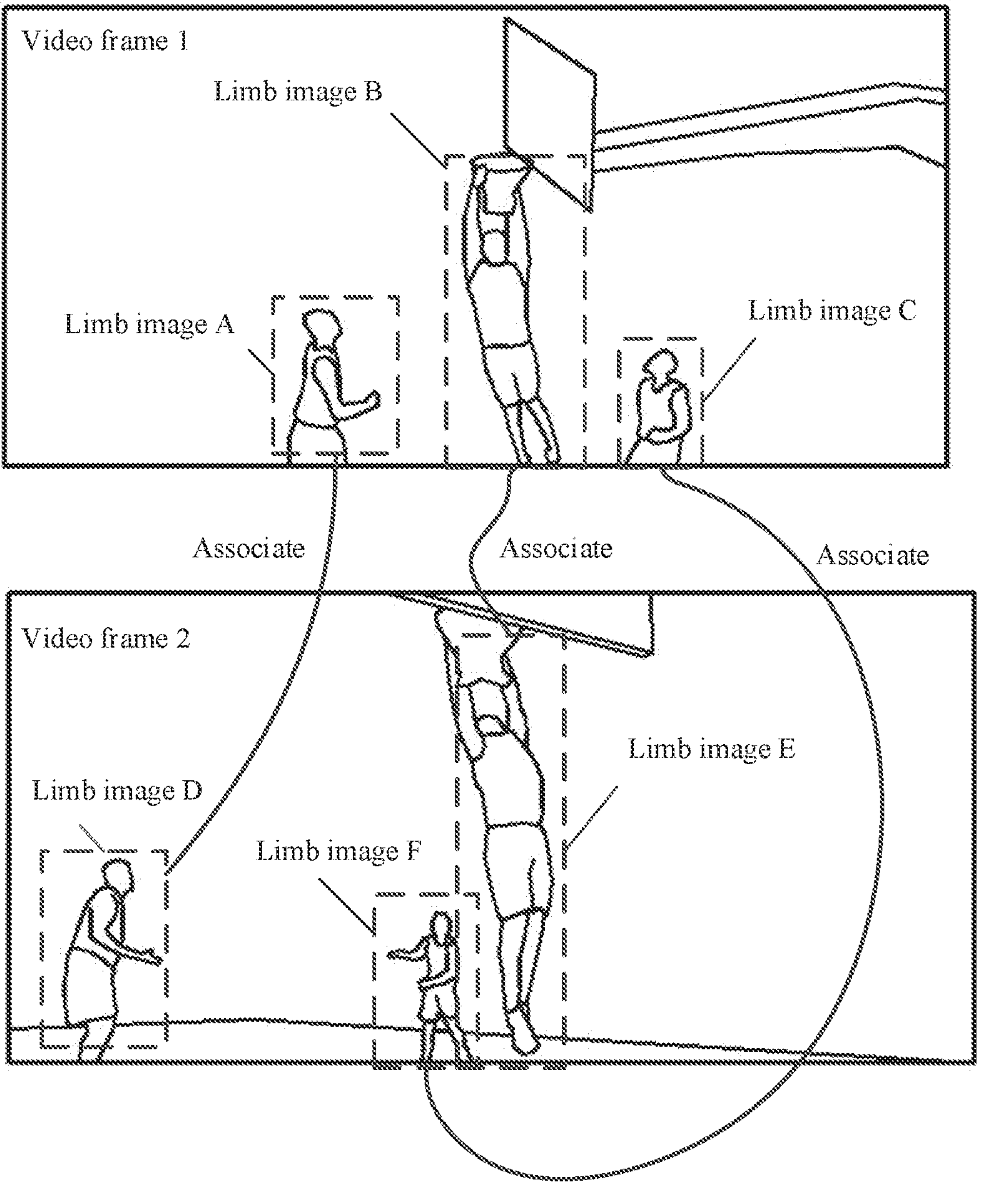
FIG. 7C is a schematic diagram of logic of associating a limb image with a limb image according to an embodiment of this application.

Referring to FIG. 7C, similarly, for the limb image B, it is determined that the target limb image set is the limb image set 5 (the limb image B and the limb image E) from the limb image set 4 (the limb image B and the limb image D), the limb image set 5 (the limb image B and the limb image E), and the limb image set 6 (the limb image B and the limb image F). For the limb image C, it is determined that the target limb image set is the limb image set 9 (the limb image C and the limb image F) from the limb image set 7 (the limb image C and the limb image D), the limb image set 8 (the limb image C and the limb image E), and the limb image set 9 (the limb image C and the limb image F).

Through the foregoing implementation, the limb association relationship between a preceding frame and a succeeding frame is determined based on the first similarity corresponding to each limb image set, which improves the accuracy of the limb association relationship between a preceding frame and a succeeding frame, then improves the accuracy of the motion trajectory, and improves the image deduplication effect.

S20322: Obtain the at least one reference motion trajectory corresponding to the reference video based on the face-limb association relationship and the limb association relationship between a preceding frame and a succeeding frame.

In this embodiment of this application, the face-limb association relationship includes an association relationship between a feature of the face image and a feature of the limb image in each reference video, that is, an association relationship between the face image and the limb image in each video frame. The limb association relationship between a preceding frame and a succeeding frame includes the association relationship between features of limb images in front and rear frames and the feature of the limb image. The at least one reference motion trajectory may be determined based on the face-limb association relationship and the limb association relationship between a preceding frame and a succeeding frame, each reference motion trajectory including a plurality of limb features and a plurality of face features of a target object.

In some embodiments, the at least one reference motion trajectory may be determined based on the face-limb association relationship and the limb association relationship between a preceding frame and a succeeding frame, each reference motion trajectory including a plurality of limb features and a plurality of face features of a target object, which may be implemented in the following manner. Video frames in which limbs of the same target object occur and video frames in which faces of the same target object occur are retrieved from the face-limb association relationship and the limb association relationship between a preceding frame and a succeeding frame based on the playback order. In some cases, a plurality of target objects may simultaneously occur in some video frames. The features of the target object (including limb features and face features) in the video frames in which the limbs of the same target object occur are combined based on the playback order of the video frames in which the target object occurs, to obtain the reference motion trajectory of the corresponding target object.

Figure 8:
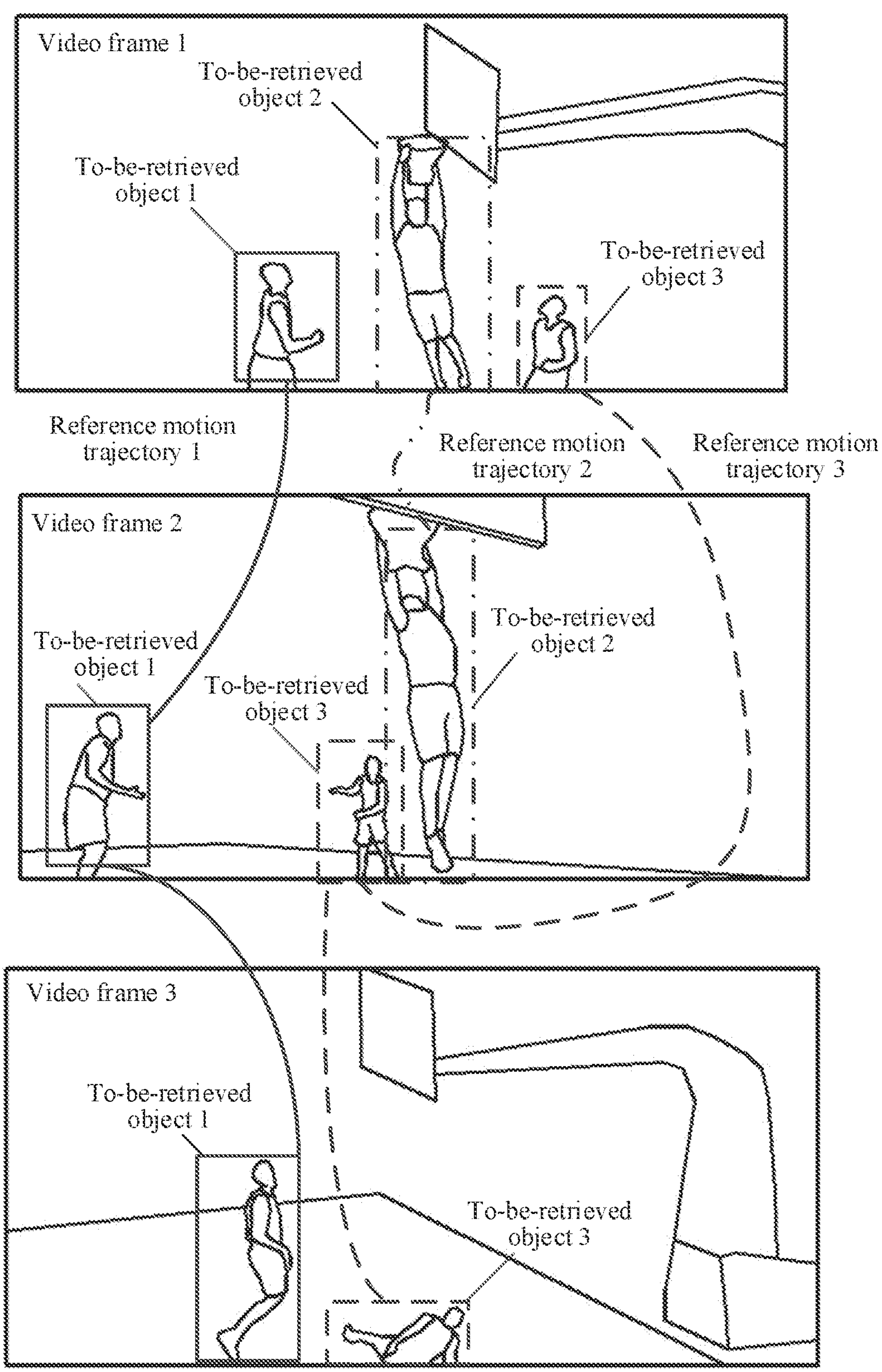
FIG. 8 is a schematic diagram of a reference motion trajectory according to an embodiment of this application.

For example, referring to FIG. 8, the face-limb association relationship includes a face feature A and a limb feature A in the video frame 1 (an object in which the foregoing features occur is denoted as a target object 1), a face feature D and a limb feature D in a video frame 2 (an object in which the foregoing features occur is denoted as a target object 2), and a face feature G and a limb feature G in a video frame 3 (an object in which the foregoing features occur is denoted as a target object 3). The limb association relationship between a preceding frame and a succeeding frame includes an association relationship between the limb feature A and the limb feature D and an association relationship between the limb feature D and the limb feature G.

For the target object 1, the limb feature A in the video frame 1 is used to retrieve the limb association relationship between a preceding frame and a succeeding frame to obtain the limb feature D belonging to the target object 1 in the video frame 2 and obtain the limb feature G belonging to the target object 1 in the video frame 3, so that it may be determined that the corresponding limb features of the target object 1 in the video frames 1 to 3 are the limb feature A, the limb feature D, and the limb feature G. Similarly, it may be determined through retrieval that the corresponding face features of the target object 1 in the video frames 1 to 3 are the face feature A, the face feature D, and the face feature G. The foregoing face features and limb features of the target object 1 are combined based on an order in which the face features and the limb features in the video frames 1 to 3 occur, to obtain the reference motion trajectory of the target object 1. A reference motion trajectory 1 of the target object 1 is a motion trajectory of the target object 1 in the video frame 1, the video frame 2, and the video frame 3, including the face feature A and the limb feature A in the video frame 1, the face feature D and the limb feature D in the video frame 2, and the face feature G and the limb feature G in the video frame 3, which may be denoted as: (limb feature A, face feature A), (limb feature D, face feature D), and (limb feature G, face feature G).

Similarly, a reference motion trajectory 2 and a reference motion trajectory 3 are obtained based on the face-limb association relationship and the limb association relationship between a preceding frame and a succeeding frame. The reference motion trajectory 2 is a motion trajectory of the target object 2 in the video frame 1 and the video frame 2, and the reference motion trajectory 3 is a motion trajectory of the target object 3 in the video frame 1, the video frame 2, and the video frame 3.

Through the foregoing implementation, the motion trajectory included in the video may be determined by using the face-limb association relationship and the limb association relationship between a preceding frame and a succeeding frame, and the importance of each limb image in the deduplication may be enhanced during subsequent deduplication of the images by using the motion trajectory, so as to avoid causing a missed recall as a result of information loss due to a single embedding.

In some embodiments, in the process of determining the limb association relationship between a preceding frame and a succeeding frame, the trajectory information corresponding to each limb image is recorded. Specifically, each limb image included in a first reference video frame of the plurality of reference video frames may be used as a starting frame, and corresponding initialized trajectory information of each reference motion trajectory may be recorded. The initialized trajectory information includes the following information: a serial number of the motion trajectory, a ranking of occurrence of the limb image in the motion trajectory, coordinates of the limb image (for example, coordinates of two vertices of a diagonal of a box surrounding the limb image), a limb feature, a serial number of a frame in which the limb image occurs, and a serial number of a video in which the limb image occurs. Exemplarily, initialized values of the serial number of the motion trajectory and the ranking of occurrence of the limb image in the motion trajectory are 1.

The limb image A in the video frame 1 is used as an example. Trajectory information 1 corresponding to the reference motion trajectory 1 is recorded. In the trajectory information 1, the serial number of the motion trajectory is 1, the ranking of occurrence of the limb image in the motion trajectory is 1, coordinates of the limb image are (2, 2), the limb feature is the limb feature A, the serial number of the frame in which the limb image occurs is 1, and the serial number of the video in which the limb image occurs is the video 1.

Starting from the first reference video frame, after each target limb image set is screened out, corresponding trajectory information is recorded based on the second limb image included in the screened target limb image set.

For example, an association exists between the limb image A and the limb image D. Trajectory information 2 corresponding to the reference motion trajectory 1 is recorded. In the trajectory information 2, the serial number of the motion trajectory is 1, the ranking of occurrence of the limb image in the motion trajectory is 2, coordinates of the limb image are (2, 3), the limb feature is the limb feature D, the serial number of the frame in which the limb image occurs is 2, and the serial number of the video in which the limb image occurs is the video 1.

The trajectory information further includes face image information, and the face image information includes a serial number of the face image associated with the limb image and includes the corresponding face features. The serial numbers of the face images may start from 0, with an increment of 1 for each succeeding face image.

The limb image A in the video frame 1 is still used as an example. The trajectory information 1 corresponding to the reference motion trajectory 1 further includes a serial number of the motion trajectory, a ranking of occurrence of the limb image in the motion trajectory, coordinates of the limb image, a limb feature, a face feature, a serial number of the face image, a serial number of a frame in which the limb image occurs, and a serial number of a video in which the limb image occurs. The face feature is the face feature A, and the serial number of the face image is 0.

In this embodiment of this application, if a limb feature has no associated limb feature in a next frame, corresponding trajectory information does not need to be recorded.

For any reference video frame, if a limb image that is not associated with the limb image in a previous frame exists, that is, a new limb image exists in the reference video frame, the limb image is used as a new limb image, and initialized trajectory information of a new reference motion trajectory is recorded.

In some embodiments, when a plurality of reference motion trajectories exist, a second similarity among a plurality of face signs included in each of the plurality of reference motion trajectories is determined, and a trajectory association relationship among the plurality of reference motion trajectories is obtained based on the determined second similarity. The second similarity may also be expressed by the L2 distance. Correspondingly, in the process of determining a target video from the candidate videos based on the obtained reference motion trajectories and candidate motion trajectories corresponding to the candidate videos, the target video may be determined from the candidate videos based on the obtained reference motion trajectories, the candidate motion trajectories corresponding to the candidate videos, the trajectory association relationship among the reference motion trajectories, and a trajectory association relationship among the candidate motion trajectories.

Specifically, when the second similarity among the plurality of face signs included in each of the plurality of reference motion trajectories is determined, for any two of the plurality of reference motion trajectories, a second similarity between face features included in each of any two reference motion trajectories. Correspondingly, when the trajectory association relationship among the plurality of reference motion trajectories is obtained based on the determined second similarity, the trajectory association relationship between any two reference motion trajectories is obtained based on the determined second similarity.

When the trajectory association relationship among the plurality of reference motion trajectories is obtained based on the determined second similarity, the following operations are performed for any two reference motion trajectories included in the plurality of reference motion trajectories:

calculating second similarities between a plurality of face features included in one reference motion trajectory and a plurality of face features included in another reference motion trajectory, and screening out, from the calculated second similarities, a target second similarity having a corresponding value not less than a preset second similarity threshold; and storing a trajectory association relationship between the any two reference motion trajectories when it is determined based on each screened target second similarity that the any two reference motion trajectories belong to a same target object.

When When it is determined based on each screened target second similarity that the any two reference motion trajectories belong to a same target object, as a possible implementation, it is determined that any two reference motion trajectories belong to the same target object when a quantity of target second similarities is greater than a preset quantity threshold (for example, the preset quantity threshold is less than a total quantity of face images and greater than half of the total quantity of face images). As another possible implementation, when a ratio of the quantity of target second similarities to the total quantity of face images is not less than a preset proportion threshold (for example, the preset proportion threshold is a value greater than 50%, indicating that two reference motion trajectories have more similar parts than dissimilar parts), it is determined that any two reference motion trajectories belong to the same target object. The total quantity of face images is a minimum value of a quantity of face features included in one reference motion trajectory, or a quantity of face features included in another reference motion trajectory, or a quantity of face features included in two reference motion trajectories.

Figure 9:
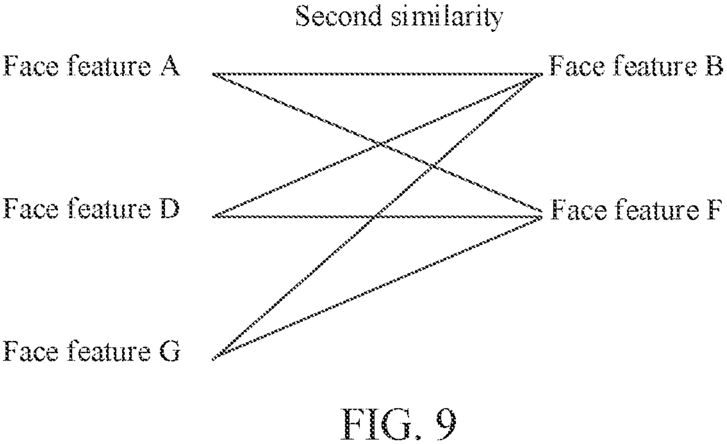
FIG. 9 is a schematic diagram of logic of calculating a second similarity according to an embodiment of this application.

Referring to FIG. 9, the reference motion trajectory 1 and the reference motion trajectory 2 are used as examples. The reference motion trajectory 1 includes a face feature A, a face feature D, and a face feature G of the target object 1, and the reference motion trajectory 2 includes a face feature B and a face feature F of the target object 1. Second similarities between the face feature A and the face feature B, between the face feature A and the face feature F, between the face feature D and the face feature B, between the face feature D and the face feature F, between the face feature G and the face feature B, and between the face feature G and the face feature F are respectively calculated. Then the target second similarity having a corresponding value not less than the preset second similarity threshold is screened out from the calculated second similarities. Assuming that the preset proportion threshold is 0.5, the second similarity threshold is 0.2, the quantity of target second similarities is 2, and the total quantity of face images is 2. In this case, the ratio of the quantity of target second similarities to the total quantity of face images is 1, which is not less than the preset second similarity threshold of 0.5, and it is determined that an association exists between the reference motion trajectory 1 and the reference motion trajectory 2.

If an association exists between two reference motion trajectories, then face serial numbers in the two reference motion trajectories may be marked as the same serial number, and the same serial number may be either of the face serial numbers corresponding to the two reference motion trajectories or may be one of the face serial numbers corresponding to the two reference motion trajectories which has a smaller value.

Through the foregoing implementation, when a plurality of reference motion trajectories exist, the trajectory association relationship among the plurality of reference motion trajectories is obtained based on the determined second similarities, and during subsequent deduplication of images based on the reference motion trajectories, the associated motion trajectories may be quickly retrieved based on the trajectory association relationship, thereby improving efficiency of image retrieval. Further, reference motion trajectories belonging to the same target object may be associated, thereby improving the efficiency of subsequent image retrieval.

In some embodiments, to prevent the face images with poor image quality from affecting the image retrieval results, after each reference motion trajectory is obtained, for face images corresponding to a plurality of face features included in each reference motion trajectory, a set quantity of face images may be selected from a plurality of face features based on an image quality assessment value corresponding to each of the plurality of face features, and a plurality of face features included in the reference motion trajectory are updated based on the face features corresponding to the selected face images. The image quality assessment value may be determined based on at least one of information such as image sharpness, a color difference, and noise of the corresponding face image, which is not limited thereto. During selection of a set quantity K of face images, first K face features with larger image quality assessment values may be selected.

Figure 10A:
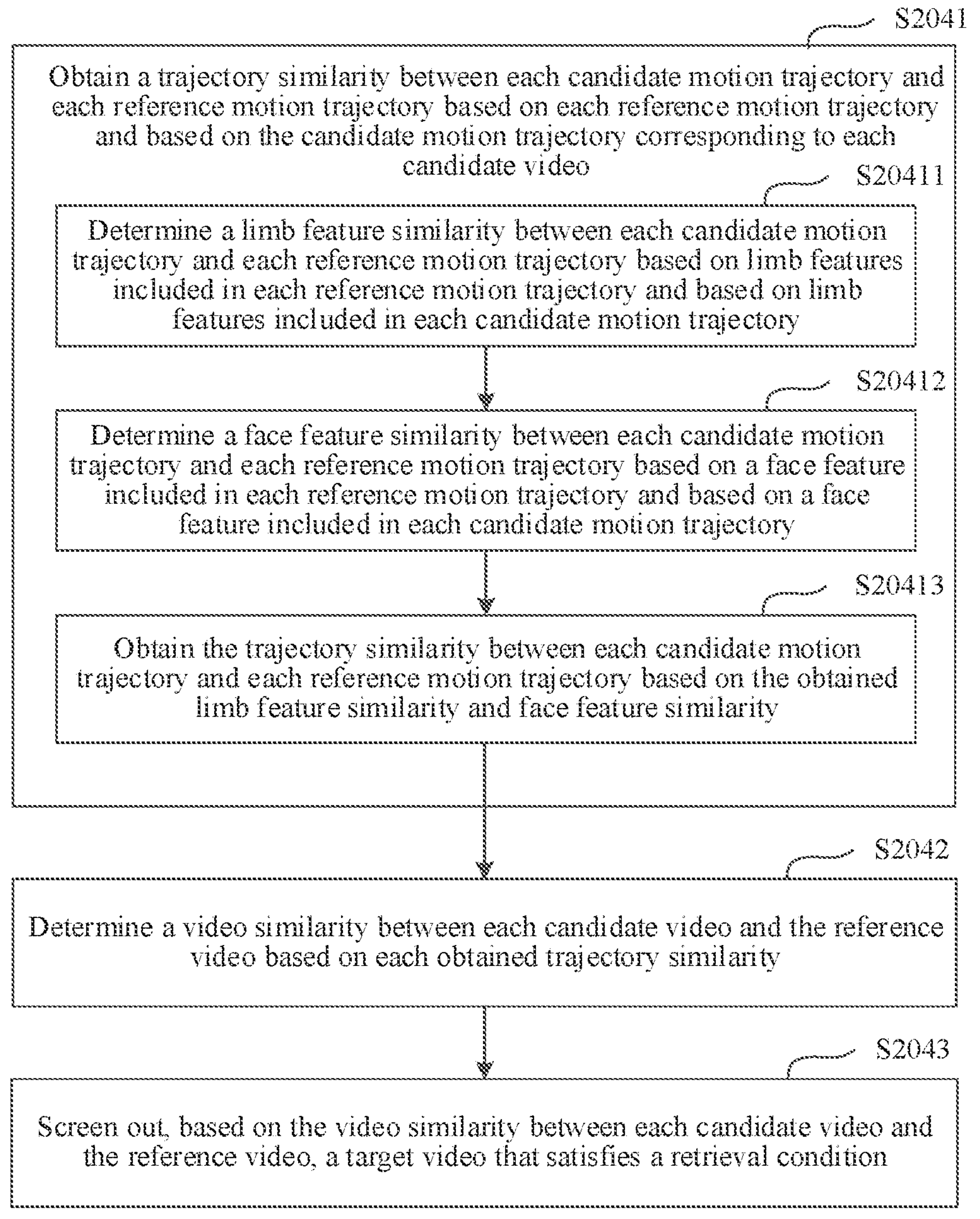
FIG. 10A is a schematic flowchart of determining a target video according to an embodiment of this application.

In some embodiments, to improve the accuracy of video deduplication, referring to FIG. 10A, S204 may include but is not limited to the following steps:

S2041: Obtain a trajectory similarity between each candidate motion trajectory and each reference motion trajectory based on each reference motion trajectory and based on the candidate motion trajectory corresponding to each candidate video.

Specifically, S2041 may include but is not limited to the following steps:

S20411: Determine a limb feature similarity between each candidate motion trajectory and each reference motion trajectory based on the limb features included in each reference motion trajectory and based on limb features included in each candidate motion trajectory.

A reference motion trajectory A and a candidate motion trajectory B are used as examples. The reference motion trajectory A is any one of the reference motion trajectories, and the candidate motion trajectory B is any one of the candidate motion trajectories.

Referring to FIG. 10B, assuming that the reference motion trajectory A includes a limb feature A1, a limb feature A2, . . . , and a limb feature AN, and the candidate motion trajectory B includes a limb feature B1, a limb feature B2, . . . , and a limb feature BM, a limb similarity between the limb feature A1 and the limb feature B1, a limb similarity between the limb feature A2 and the limb feature B2, . . . , a limb feature similarity between the limb feature AN and the limb feature BM, and so on are respectively calculated. If values of M and N are not equal, the smaller value is used for the foregoing calculation.

S20412: Determine a face feature similarity between each candidate motion trajectory and each reference motion trajectory based on the face features included in each reference motion trajectory and based on face features included in each candidate motion trajectory.

Assuming that the reference motion trajectory A includes a face feature A1, a face feature A2, . . . , and a face feature AN, and the candidate motion trajectory B includes a face feature B1, a face feature B2, . . . , and a face feature BM, a face feature similarity between the face feature A1 and the face feature B1, a face feature similarity between the face feature A2 and the face feature B2, . . . , and a face feature similarity between the face feature AN and the face feature BM are respectively calculated. If values of M and N are not equal, the smaller value is used for the foregoing calculation.

S20413: Obtain the trajectory similarity between each candidate motion trajectory and each reference motion trajectory based on the obtained limb feature similarity and face feature similarity.

The following processing is performed for each limb feature similarity: determining the trajectory similarity between each candidate motion trajectory and each reference motion trajectory.

In this embodiment of this application, the reference motion trajectory A and the candidate motion trajectory B are used as examples. The trajectory similarity between the reference motion trajectory A and the candidate motion trajectory B is determined by at least one of the following information: a quantity of similar limb features in the reference motion trajectory A and the candidate motion trajectory B, and a quantity of similar face features in the reference motion trajectory A and the candidate motion trajectory B.

When the limb similarity between the limb feature in the reference motion trajectory A and the limb feature in the candidate motion trajectory B is greater than the preset limb similarity threshold (for example, 50%, indicating that similar parts are more than dissimilar parts), the limb feature in the reference motion trajectory A and the limb feature in the candidate motion trajectory B are similar limb features. Exemplarily, the preset limb similarity threshold is 0.2.

Similarly, when the face similarity between the face feature in the reference motion trajectory A and the face feature in the candidate motion trajectory B is greater than the preset face similarity threshold, the face feature in the reference motion trajectory A and the face feature in the candidate motion trajectory B are similar face features.

Through the foregoing implementation, based on each limb feature similarity and each face feature similarity, the trajectory similarity between each candidate motion trajectory and each reference motion trajectory is obtained. In this way, the trajectory similarity includes both the limb feature similarity and the face feature similarity. Therefore, the trajectory similarity is more accurate.

S2042: Determine a video similarity between each candidate video and the reference video based on each obtained trajectory similarity.

In this embodiment of this application, when a quantity of similar limb features in the reference motion trajectory A and the candidate motion trajectory B exceeds a first threshold, and/or a quantity of similar face features in the reference motion trajectory A and the candidate motion trajectory B exceeds a second threshold, it is determined that the reference motion trajectory A and the candidate motion trajectory B are the same trajectory.

The first threshold is determined based on a first set coefficient and a first limb feature quantity. The first limb feature quantity may be one of the following information: the quantity of limb features included in the reference motion trajectory A, the quantity of limb features included in the candidate motion trajectory B, and the minimum value of the quantity of limb features included in the reference motion trajectory A and the quantity of limb features included in the candidate motion trajectory B, which are not limited thereto.

For example, the quantity of limb features included in the reference motion trajectory A is 40, and the quantity of limb features included in the candidate motion trajectory B is 30. Assuming that the first set coefficient is ⅓ and the first limb feature quantity is 30, the first threshold is ⅓×30=10.

The second threshold is determined based on a second set coefficient and a second face feature quantity. The second face feature quantity may be one of the following information: the quantity of face features included in the reference motion trajectory A, the quantity of face features included in the candidate motion trajectory B, and the minimum value of the quantity of face features included in the reference motion trajectory A and the quantity of face features included in the candidate motion trajectory B, which are not limited thereto.

For example, the quantity of face features included in the reference motion trajectory A is 40, and the quantity of face features included in the candidate motion trajectory B is 30. Assuming that the first set coefficient is ¼ and the first limb feature quantity is 40, the first threshold is ¼×40=10.

In this embodiment of this application, a candidate video and a reference video are used as an example. Based on the obtained trajectory similarity, the same trajectories existing in the candidate motion trajectories of the candidate video and in the reference motion trajectories may be determined, and the video similarity between the candidate video and the reference video is determined based on a quantity of same trajectories. In this paper, the video similarity may also be referred to as video repeatability.

Exemplarily, a value of the video similarity between the candidate video and the reference video is a ratio of the quantity of same trajectories included in the candidate video and the reference video to a third trajectory quantity. The third trajectory quantity may be any one of the following quantities: a quantity of candidate motion trajectories included in the candidate video, a quantity of reference motion trajectories included in the reference video, and the minimum of the quantity of candidate motion trajectories and the quantity of reference motion trajectories, which are not limited thereto.

S2043: Screen out, based on the video similarity between each candidate video and the reference video, a target video that satisfies a retrieval condition.

Specifically, in this embodiment of this application, S2043 may include but is not limited to the following steps:

As a possible implementation, the target video that satisfies the retrieval condition is screened out based on the video similarity between each candidate video and the reference video. The candidate videos are sorted, and a specific quantity of target videos are screened out from the candidate videos.

As another possible implementation, at least one candidate video having the video similarity to the reference video exceeding a preset video similarity threshold is screened out from the candidate videos as the target video.

In this embodiment of this application, the candidate video corresponding to the reference motion trajectory A may be further used as the target video when the reference motion trajectory A and the candidate motion trajectory B are the same trajectory, and the reference motion trajectory A, the video similarity between the candidate video corresponding to the reference motion trajectory A and the reference video, and the video serial number of the candidate video corresponding to the reference motion trajectory A are obtained.

In this embodiment of this application, one or more target videos may exist, and one or more same trajectories may also exist.

The training process of the face feature extraction model is described below.

In this paper, a face feature extraction model before training is referred to as an initial face feature extraction model, and a trained face feature extraction model is referred to as a target face feature extraction model.

The training process of the initial face feature extraction model includes two stages: a data acquisition stage and a model training stage. The data acquisition stage is used for obtaining a training dataset, and the model training stage is used for training the initial face feature extraction model based on the training dataset.

In the data acquisition stage, first, each similar sample set is obtained based on a first sample similarity between sample data in the sample dataset. Second, a training dataset is constructed based on the similar sample set, each training data includes at least three samples, and the similar sample set corresponding to one of the at least three samples is different from the similar sample set corresponding to another sample.

Each similar sample set includes at least two pieces of sample data, and each two pieces of sample data in the similar sample set form a similar sample pair. The similar sample pair may also be referred to as a positive sample pair in this paper.

The process of obtaining the similar sample set based on the first sample similarity between the sample data in the sample dataset may include but is not limited to the following manners:

Manner 1: face detection is performed on each piece of sample data in the sample dataset to obtain a face image corresponding to each piece of sample data. Then every two face images in the obtained face images are labeled to determine whether every two face images are a similar sample pair, and each similar sample set is obtained based on a labeling result. The labeling of the face image may be performed by using a pre-trained labeling model.

The pre-trained labeling model may adopt various neural network models. For example, two convolutional neural networks are used to respectively extract convolution features of two face images, a fully connected network is used to fuse the convolution features of two face images, and the fused features are mapped into similarities by using an activation function (for example, a softmax function). Labeled data of a pre-trained image sample pair may be 0 (indicating dissimilarity) and 1 (indicating similarity). A difference between a prediction probability outputted by the labeling model in the training process and actual labeled data is used in a back propagation algorithm process to update a parameter of the labeling model.

Figure 11:
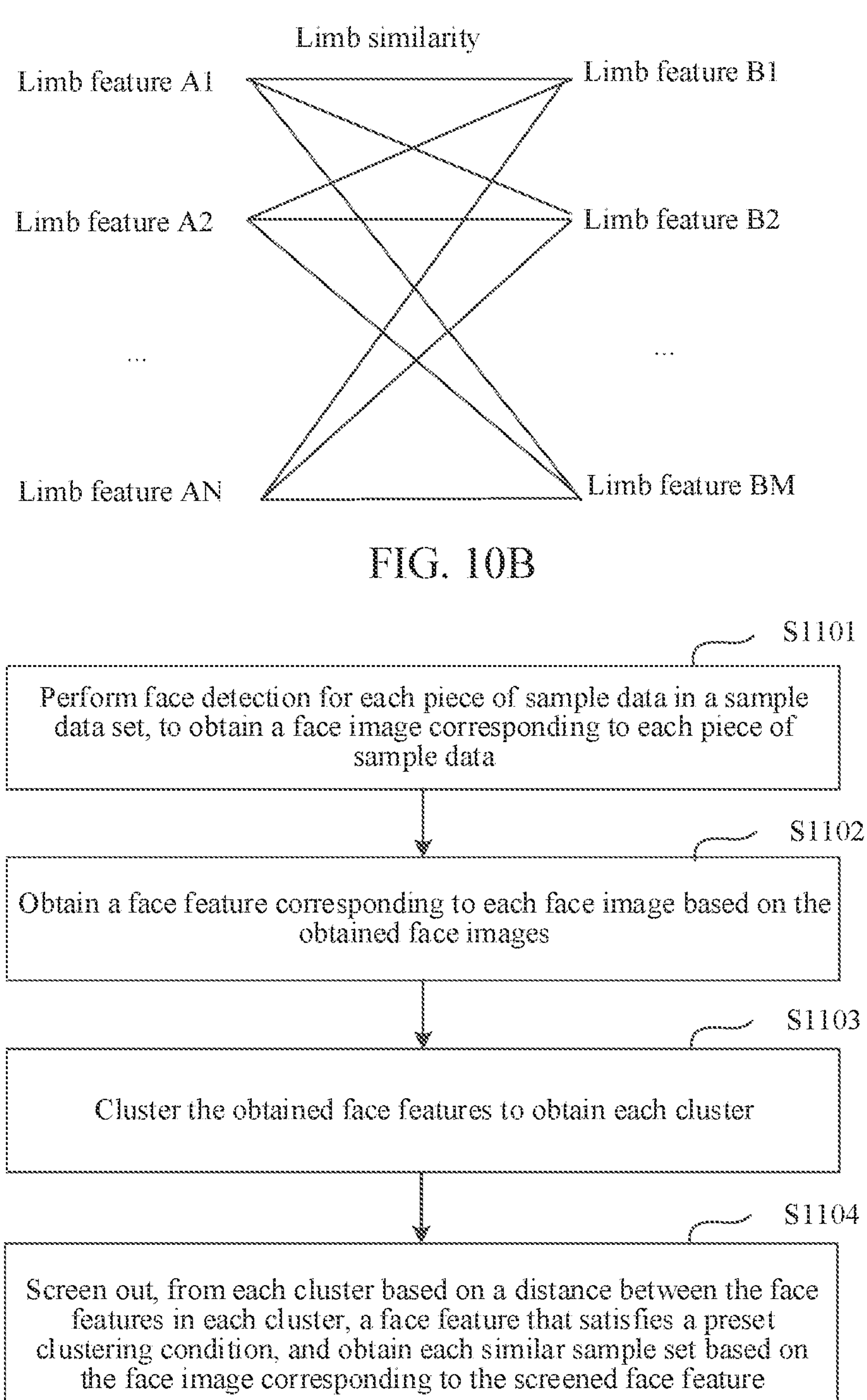
FIG. 11 is a schematic flowchart of obtaining each similar sample set according to an embodiment of this application.

Manner 2: To improve the labeling efficiency and data preparation efficiency, referring to FIG. 11, this embodiment of this application provides a schematic flowchart of a method for obtaining each similar sample set. The method is applied to an electronic device. The electronic device may be a terminal device or a server. A model training stage and a model application stage may be performed by the same electronic device or different electronic devices. A data acquisition stage involved in the model training stage and the model training stage may be performed by the same electronic device or different electronic devices. The specific process is as follows.

S1101: Perform face detection for each piece of sample data in a sample dataset, to obtain a face image corresponding to each piece of sample data. The sample dataset may include one or more videos, or may include one or more images.

In some embodiments, to further improve the labeling efficiency and the data preparation efficiency, a specific quantity of sample data may further be extracted from the sample dataset based on a preset image extraction interval before the face detection for each piece of sample data in the sample dataset. Correspondingly, during the face detection for each piece of sample data in the sample dataset, face detection may be performed for the extracted sample data, thereby reducing a calculation amount and improving the labeling efficiency.

For example, the sample dataset is a video 1, the video 1 includes a video frame 1 to a video frame N. Assuming that a preset image extraction interval of every ten frames is adopted, the video frame 1, the video frame 11, the video frame 21, and the like are extracted from video frame 1 to video frame N.

Specifically, during performing of S1101, during the face detection on the sample data, a YOLO model trained based on an open-source dataset COCO may be used to detect the face image included in the sample data and record coordinates of the face image.

A shape of the face image may be a regular figure, for example, a rectangle, or may be an irregular figure. If the shape of the face image is a regular figure, during recording of coordinates of the face image, coordinates of a central point of the face image may be used as the coordinates of the face image. If the face image is an irregular image, during recording of the coordinates of the face image, edge coordinates of the face image are used as the coordinates of the face image.

For example, referring to FIG. 3, face detection is performed on a video frame 1. The video frame 1 includes a face image A, a face image B, and a face image C. The face image 1, the face image 2, and the face image 3 are all identified by rectangles, and coordinates of central points of the face image 1, the face image 2, and the face image 3 are respectively (1, 2), (2, 3), and (4, 5). The coordinates of the face image 1, the face image 2, and the face image 3 are respectively recorded as (1, 2), (2, 3), and (4, 5).

S1102: Obtain a face feature corresponding to each of the face images based on the obtained face images.

Specifically, during performing of S1102, the obtained face images are respectively inputted into a pre-trained face model to obtain the face feature corresponding to each face image. The pre-trained face model may be a resnet101 model pre-trained by using ImageNet. Specifically, a result is outputted by a pooling layer of the pre-trained resnet101 model.

S1103: Cluster the obtained face features to obtain each cluster.

A quantity of clusters is determined based on a total quantity of face images included in each piece of sample data. Exemplarily, a ratio of the total quantity to a set quantity is calculated and rounded to obtain the quantity of clusters, which is not limited thereto.

For example, if the quantity is set to 20 and the total quantity of face images included in each piece of sample data is 200, then the quantity of clusters is =200/20=10. To be specific, the obtained face features are clustered to obtain 10 clusters.

For another example, if the quantity is set to 20 and the total quantity of face images included in each piece of sample data is 270, then the quantity of clusters is =[270/20]=14. To be specific, the obtained face features are clustered to obtain 14 clusters.

In this embodiment of this application, the quantity of face images included in each cluster needs to be greater than a quantity of images used for subsequent cluster cleaning.

S1104: Screen out, from each cluster based on a distance between the face features in each cluster, a face feature that satisfies a preset clustering condition, and obtain each similar sample set based on the face images corresponding to the screened face features.

Specifically, during performing of S1104, for each face feature in each cluster, an assessed value corresponding to the face feature is obtained based on a distance between the face feature and another face feature in the same cluster other than the face feature, and then the face feature that satisfies the preset clustering condition is screened out from each cluster based on the assessed value corresponding to each face feature in each cluster.

A face feature xi in a cluster X is used as an example. The cluster x is any one cluster in each cluster, the cluster x includes face features, and the face feature xi is any one of the face features included in the cluster x.

In some embodiments, the following operations may be adopted, but not limited thereto, to determine an assessed value corresponding to the face feature xi:

Step A1: Calculate a distance between the face feature xi and another face feature in the cluster x other than xi. The distance between the face feature xi and another face feature may be expressed by but not limited to an L2 distance.

Figure 12:
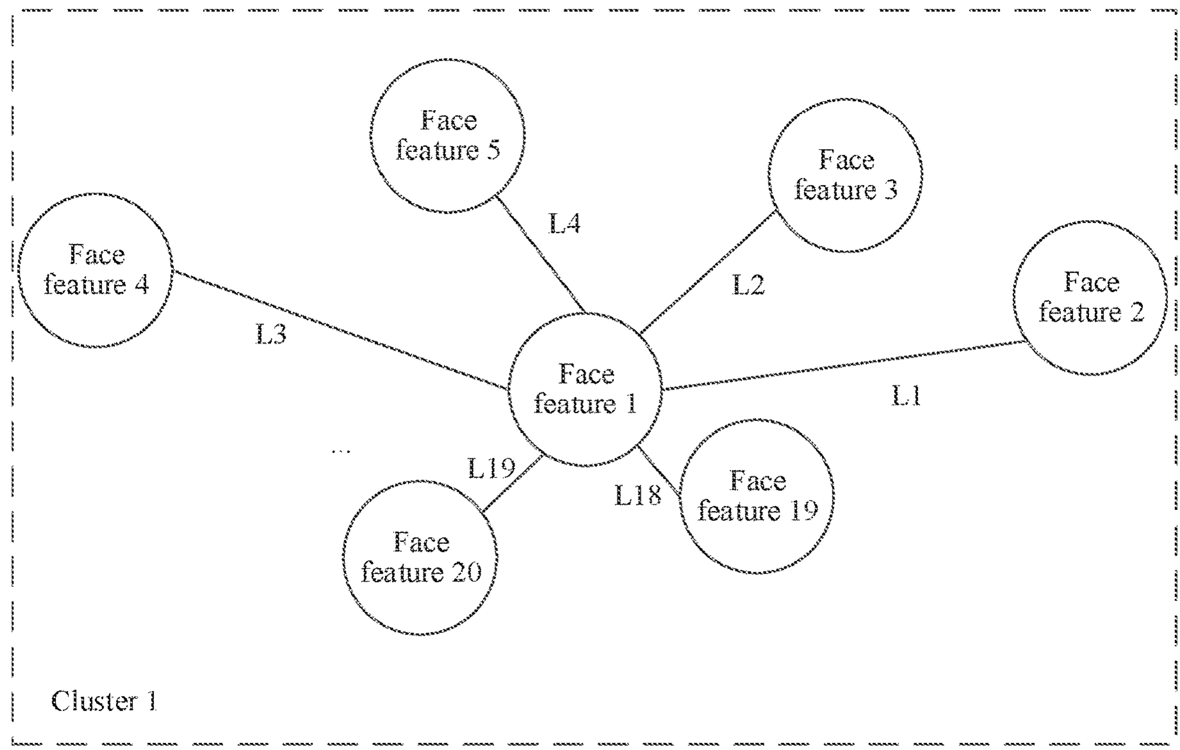
FIG. 12 is a schematic diagram of a cluster according to an embodiment of this application.

For example, referring to FIG. 12, a cluster A includes a face feature 1 to a face feature 20. For the face feature 1, a distance L1 between the face feature 1 and the face feature 2 is calculated, and a distance L2 between the face feature 1 and the face feature 3 is calculated. Similarly, distances L1-L19 between the face feature 1 and the face feature 2 to the face feature 20 are calculated.

Step A2: Screen out a set quantity of face features from other face features based on the calculated distances.

Specifically, the face features with the smallest distance are screened out from other face features based on the set quantity and the calculated distances.

For example, the distances between the face feature 1 and the face feature 2 to the face feature 20 are L1-L19 respectively. Assuming that values of L1-L19 are arranged in descending order as follows: L19, L18, . . . , and L1, and assuming that the set quantity is 5, L19, L18, L17, L16, and L15 are screened out from other face features.

Step A3: Determine the assessed value of the face feature xi based on the distance between each screened face feature and the face feature xi.

Specifically, an average value of the distances corresponding to the screened face features is used as the assessed value of the face feature xi.

For example, it is assumed that the average value of L19, L18, L17, L16, and L15 is used as the assessed value of the face feature 1.

In the process of screening out, based on the assessed value corresponding to each face feature in each cluster, the face feature that satisfies the preset clustering condition from each cluster, a face feature having a corresponding assessed value less than an assessed value threshold is screened out from the face features in each cluster, and the screened face feature is used as the face feature that satisfies the preset clustering condition.

In this embodiment of this application, if the assessed value of the face feature xi is less than the assessed value threshold, the face feature xi is retained. To be specific, if the assessed value of the face feature xi is less than the assessed value threshold, the face feature xi is the face feature that satisfies the preset clustering condition. If the assessed value of the face feature xi is not less than the assessed value threshold, the face feature xi is deleted from the cluster x.

The assessed value threshold is determined based on the assessed value corresponding to each face feature in the cluster x. As a possible implementation, an intermediate value may be determined from the assessed values corresponding to the face features in the cluster x based on the value, and the intermediate value may be used as the assessed value threshold. The intermediate value is determined in the following manner. When the assessed values are successively arranged in ascending or descending order, if a number of assessed values is odd, the assessed value in a middle position in an arrangement order is the intermediate value, and if a number of assessed values is even, an average value of two values ranked in the middle is the intermediate value. As another possible implementation, the average value of the assessed values corresponding to the face features in the cluster x is used as the assessed value threshold.

For example, assuming that the assessed value threshold is 10 and the assessed value of the face feature 1 is greater than the assessed value threshold, the face feature 1 is deleted from the cluster 1.

Figure 13:
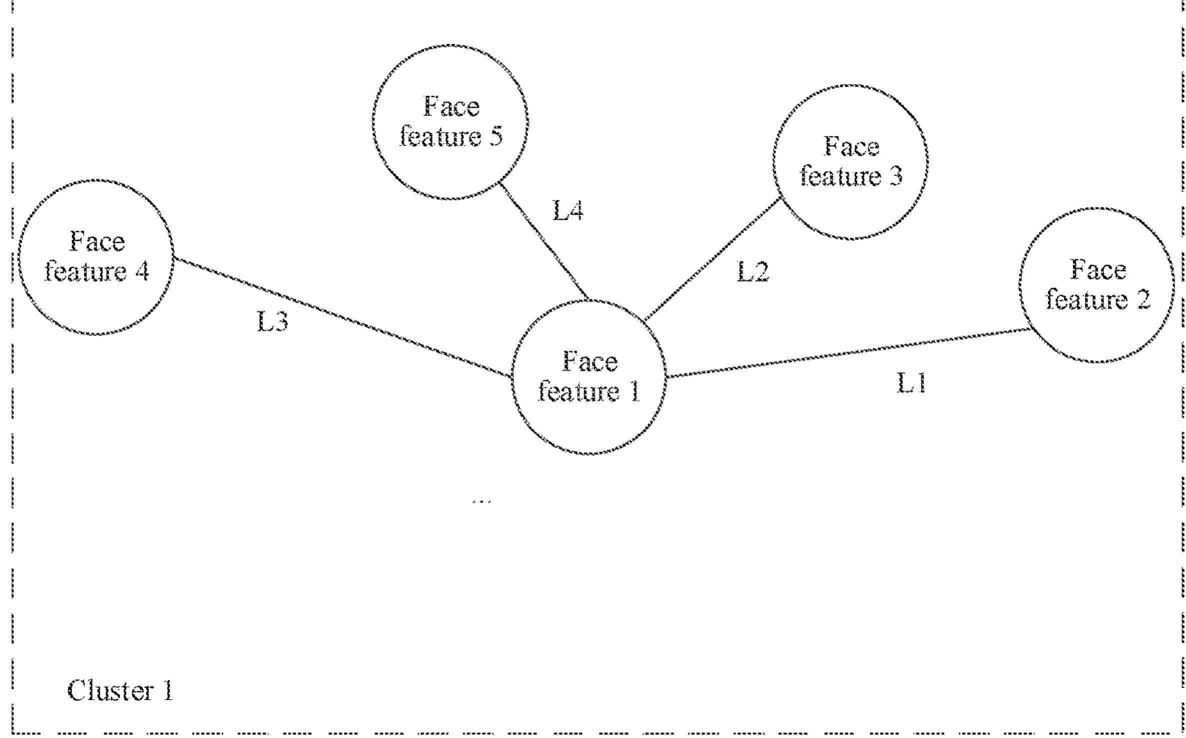
FIG. 13 is a schematic diagram of another cluster according to an embodiment of this application.

Similarly, as shown in FIG. 13, for the cluster 1, the assessed values respectively corresponding to the face feature 1 to the face feature 20 are respectively calculated. Assuming that the assessed value threshold is 10, and the assessed values respectively corresponding to the face feature 1 to the face feature 20 are respectively 1 to 20, the face feature 10 to the face feature 20 are deleted from the cluster 1. In this case, the cluster 1 includes the face feature 1 to the face feature 9.

For each cluster, cluster cleaning may be performed by using step A1 to step A4, so as to obtain a clean cluster. Each clean cluster is a similar sample set, and images included in the set are similar samples.

In this embodiment of this application, if a quantity of face features included in a cluster is less than a set quantity of clusters, the cluster may be discarded. For example, cluster data is set to 5. When a quantity of face features included in a cluster is less than 5, the cluster is discarded.

Assuming that N similar sample sets exist, due to abundant online video resources, a massive amount (N sets) of data may be collected, such as millions of sets.

As a possible implementation, in the process of constructing a training dataset based on each similar sample set, referring to FIG. 14, an embodiment of this application provides a schematic flowchart of constructing a training dataset. The method is applied to an electronic device. The electronic device may be a terminal device or a server. The method may include but is not limited to the following steps:

S1401: Extract a corresponding similar sample pair from the obtained each similar sample set respectively.

Due to the limited memory of a GPU of a computer, all positive sample pairs need to be fed to the GPU for training in batches during training as a whole. Therefore, it is efficient to mine negative samples in each triplet from one batch.

For all N similar sample sets, model learning is performed once for every bs similar sample sets, and bs similar sample sets are processed in one batch. In the bs similar sample sets, two pieces of sample data may be randomly extracted from each set as similar image pairs.

For example, referring to FIG. 15, the similar sample sets include a similar sample set 1, a similar sample set 2, . . . , and a similar sample set bs. The similar sample set 1 includes sample data 1a, 1b, 1c, and the like. The sample data 1a, 1b, and 1c are all face images of the same man, and the similar sample set 2 includes sample data 2a, 2b, 2c, and the like. The similar sample set bs includes sample data bsa, bsb, bsc, and the like. Two pieces of sample data 1a and 1b are extracted from the similar sample set 1 to obtain a similar sample pair 1 (1a, 1b), and two pieces of sample data 2a and 2b are extracted from the similar sample set 2 to obtain a similar sample pair 2 (2a, 2b). Similarly, two pieces of sample data bsa and bsb are extracted from the similar sample set bs, to obtain a similar sample pair bs (bsa, bsb). In this paper, the sample data may also be referred to as samples for short.

S1402: Respectively perform the following operations for each similar sample pair:

first, using one sample included in one similar sample pair as a reference sample, respectively extracting one corresponding another sample from other similar sample pairs, and calculating a second sample similarity between each of the other extracted samples and the reference sample; and second, determining at least one target sample from the other samples based on the calculated second sample similarity, and obtaining at least one piece of training data based on the at least one target sample and the one similar sample pair.

In this embodiment of this application, when the training data includes three samples, the training data may alternatively be referred to as a triplet. The triplet is represented as (a, p, n), where a represents an anchor point, p represents a positive sample, and n represents a negative sample. In a triplet sample, a and p form a positive sample pair, and a and n form a negative sample pair. In a learning task, to ensure that positive sample pairs can be retrieved by each other, features of positive sample pairs need to be close enough to each other, while the negative sample pairs need to be far enough apart. In this paper, the reference sample in the similar sample pair is referred to as an anchor point, another sample in the similar sample pair is referred to as a positive sample, and the determined target sample is referred to as a negative sample.

In this embodiment of this application, when a corresponding other sample is extracted from other similar sample pairs, one sample may be randomly selected from other similar sample pairs. The second sample similarity may be but is not limited to the L2 distance.

The similar sample pair 1(1a, 1b) is used as an example. Referring to FIG. 16, sample data 1a in the similar sample pair 1(1a, 1b) is used as a reference sample, sample data 2a is extracted from the similar sample pair 2 (2a, 2b), . . . , and sample data bsa is extracted from the similar sample pair bs (bsa, bsb). Second sample similarities between a reference sample 1a and the sample data 2a, the sample data 3b, . . . , and the sample data bsa are calculated.

The process of determining at least one target sample from other samples based on the calculated second sample similarity may include but is not limited to the following manners:

Target sample determination manner 1: The other samples are sorted in ascending order based on values of the calculated second sample similarities, and a preset target sample quantity of target samples are successively selected from the other samples in ascending order based on a sorting result.

For example, second sample similarities between a reference sample 1a and a sample 2a, a sample 3b, . . . , and a sample bsa are respectively L2a, L3b, . . . , and Lbsa. The other samples are sorted in ascending order based on the values of the calculated second sample similarities, and the sorting result is L2a, L3b, . . . , and Lbsa. Assuming that the preset target sample quantity is 20, 20 samples are successively selected from other samples based on the sorting result: a sample 2a, a sample 3b, . . . , and a sample 20a, which are used as the target samples.

Target sample determination manner 2: Hard negative samples are more valuable than negative samples for metric learning, because features of extremely similar samples need to be learned. For the extremely similar samples, it is considered that a smaller distance between the features of the extremely similar samples indicates a higher similarity. However, in massive video data, a probability that two images are extremely similar samples is relatively low. Therefore, in this embodiment of this application, a set quantity of similar samples closest to the reference sample may be directly removed, thereby effectively avoiding a case that two images are extremely similar.

Specifically, the other samples are sorted in ascending order based on the values of the calculated second sample similarities, a preset sample deletion quantity of samples are deleted from the other samples in ascending order based on the sorting result, and the preset target sample quantity of target samples are successively selected from the deleted other samples.

For example, second sample similarities between a reference sample 1a and a sample 2a, a sample 3b, . . . , and a sample bsa are respectively L2a, L3b, . . . , and Lbsa. The other samples are sorted in ascending order based on the values of the calculated second sample similarities, and the sorting result is L2a, L3b, . . . , and Lbsa. Assuming that the preset sample deletion quantity is 5 and the preset target sample quantity is 20, the sample 2a, the sample 3b, the sample 4a, the sample 5b, and the sample 6a are deleted from other samples based on the sorting result, and 20 samples are successively selected from a sample 7a, a sample 8b, . . . , and the sample bsa: a sample 7a, a sample 8b, . . . , and a sample 27a, which are used as the target samples.

This embodiment of this application only uses the sorting in ascending order as an example. In an actual application process, the sorting may alternatively be performed in ascending order. If the sorting is performed in descending order, the target samples are successively selected from other samples in descending order based on the sorting result.

In the process of obtaining at least one piece of training data based on at least one target sample and a similar sample pair, a similar sample pair is respectively combined with at least one target sample to obtain at least one piece of training data.

For example, assuming that for a reference sample 1a, the target sample is the sample 7a, the sample 8b, . . . , and the sample 27a, then the similar sample pair 1 (1a, 1b) is respectively combined with the sample 7a, the sample 8b, . . . , and the sample 27a, to obtain training data. The training data includes (1a, 1b, 7a), (1a, 1b, 8b), (1a, 1b, 27a).

Through the foregoing implementation, an example in which the preset target sample quantity is 20 is used. Each similar sample pair may generate 20 triplets, and the whole batch may obtain 20*bs triplets. To ensure that negative samples are valid for mining, bs may be set to a relatively large value, such as 1024.

Because metric learning based on triplets has more requirements for hard samples, the model cannot learn distinguishing representation if the samples are all simple samples. Through the foregoing implementation, it cannot be ensured that first 20 negative samples are all hard negative samples, but it can be ensured that more hard samples exist, which is more beneficial to metric learning.

In the model training stage, FIG. 17 is a schematic structural diagram of a possible face feature extraction model according to an embodiment of this application. The face feature extraction model includes a convolutional neural network (CNN) and an embedding layer (Fc-embedding). The CNN is configured to extract basic features, the CNN may use a feature extraction module of resnet101, and the embedding layer (Fc-embedding) is used to output human image representation.

As shown in Table 1, the CNN includes convolution layers Conv1, Conv2_x, Conv3_x, Conv4_x, Conv5_x, the Conv1, Conv2_x, Conv3_x, Conv4_x, and Conv5_x are used to extract features of different levels of images. Exemplarily, shallow Conv1 and Conv2_x may be used to extract shallow features of images, such as corners, textures, and brightness, and deep Conv3_x, Conv4_x, and Conv5_x may be used to extract abstract features of images, such as eyes, nose, mouth, and limbs.

Conv1 is convolution of 7×7×64, and has a stride equal to 2. Conv2_x includes a maximum pooling layer of 3×3 and 3 blocks, and a stride of the maximum pooling layer is equal to 2. Conv3_x includes 4 blocks, Conv4_x includes 23 blocks, and Conv5_x includes 3 blocks.

TABLE 1

Structure description of CNN

| Layer name | Output size | ResNet-101 | |
|---|---|---|---|
| Convl | 224 × 224 | 7 × 7, 64, stride 2 | |
| Conv2__x | 112 × 112 | 3 × 3 max pool, stride 2 | |
| | | 1 × 1, 64<br>3 × 3, 64<br>1 × 1, 256 | x3 blocks |
| Conv3__x | 56 × 56 | 1 × l, 128<br>3 × 3, 128<br>1 × 1, 512 | x4 blocks |
| Conv4__x | 28 × 28 | 1 × l, 256<br>3 × 3, 256<br>1 × 1, 1024 | x23 blocks |
| Conv5__x | 14 × 14 | 1 × 1, 512<br>3 × 3, 512<br>1 × 1, 2048 | x3 blocks |

As shown in Table 2, Fc-embedding outputs human image representation, and an embedding dimension 128 is outputted based on the embedding module outputted by the CNN. Pool is the maximum pooling layer, and Fc-embedding is a full connection layer. Table 1 and Table 2 are all to-be-learned model parameters.

TABLE 2

Structure description of embedding module

| Layer name | Output size | Layer |
|---|---|---|
| Pool | 1 × 2048 | Max pool |
| Fc-embedding | 1 × 128 | Full connection |

During parameter initialization, parameter initialization may be performed on Conv1-Conv5 by using a multi-label pre-training model, and parameter initialization may be performed on other structures such as Fc-embedding by using a Gaussian distribution with a variance of 0.01 and a mean of 0.

Specifically, to improve model performance and the model training effect, in the model training process, referring to FIG. 18, an embodiment of this application provides a schematic flowchart of constructing a training dataset. The method is applied to an electronic device. The electronic device may be a terminal device or a server. Epoch training is performed on an initial face feature extraction model. The following operations are performed in each epoch process.

S1801: Construct a training dataset corresponding to each batch based on each similar sample set included in a sample dataset and a preset batch data processing capacity, each training data including at least three samples, the similar sample set corresponding to one of the at least three samples being different from the similar sample set corresponding to another sample.

In this embodiment of this application, after each similar sample set is obtained in a data acquisition stage, the training dataset corresponding to each batch may be obtained based on each similar sample set in the data acquisition stage, or the training dataset corresponding to each batch may be obtained based on each similar sample set in a model training stage. For the method for obtaining the training dataset, reference is made to S1401-S1402.

S1802: Input constructed training subsets into the initial face feature extraction model in batches to obtain a corresponding total model loss, adjust the initial face feature extraction model based on the obtained total model loss, and output a target face feature extraction model when it is determined that a preset convergence condition is satisfied.

For a total number N of positive image sample sets, two samples are randomly extracted from each positive sample set as a positive sample pair during each epoch, all positive image sample sets are traversed once during each epoch, and finally, N positive sample pairs need to be processed during each epoch.

During each epoch, data learning and model updating are performed in batches (network updating is performed in batches, and network parameters are updated once by using data of one batch), a number bs of image pairs are randomly extracted during each epoch for inputting to and updating the model, and then bs sample pairs are extracted from the remaining data, and so on, with learning of a total of N/bs batches needing to be performed.

In each batch, for one piece of training data, forward calculation of the model is performed, an output of each model parameter in Table 1 and Table 2 is obtained, and corresponding subgraph measurement loss is calculated. Specifically, triplet loss may be used as the subgraph measurement loss corresponding to the training data. For a triplet (a, p, n), triplet loss $l_{tri}$ of the triplet (a, p, n) is calculated by the following formula:

$$l_{tri}=\max(\|x_a-x_p\|-\|x_a-x_n\|+\alpha,0)$$

where $x_a$, $x_p$, and $x_n$ respectively represent face features corresponding to a, p, and n in the triplet, and a is a margin for representing an L2 distance between two embeddings. The triplet loss is intended to enable a distance between an anchor and a negative to be greater than a distance between the anchor and a positive by the margin. Exemplarily, the margin is set to 0.6.

In this embodiment of this application, in each batch, for each batch of bs triplets, the corresponding subgraph measurement loss may be calculated by using the foregoing formula. The total model loss is calculated based on the subgraph measurement loss corresponding to each of the bs triplets.

Based on the total model loss, in the process of adjusting the initial face feature extraction model, a method including but not limited to gradient descent (for example, SGD) may be adopted for back propagation of a gradient of each model parameter in a computing network. When the total number of N/bs updates is completed, an epoch is completed.

In the process of updating the model parameter based on the gradient, the calculated total model loss may be used for gradient backward calculation to obtain a gradient of an updated model parameter, and the parameter value of the model parameter is updated based on the obtained gradient. During the update of the parameter value of the model parameter based on the obtained gradient, the model parameter may be updated based on different learning rates. The learning rate is a hyper-parameter, and is used to control a degree of changing the model in response to an estimation error every time a model weight is updated. Exemplarily, the learning rate is 0.0005, and the learning rate is adjusted to 0.1 times the original value every 10 rounds.

In this embodiment of this application, the preset convergence conditions may include but are not limited to at least one of the following conditions:

Condition 1: A number of epochs reaches a preset epoch number threshold. For example, the epoch number threshold is 10.

Condition 2: An average total model loss after consecutive P1 times is less than a preset loss threshold.

Condition 3: An average total model loss for consecutive P2 times does not decrease.

The average total model loss is determined based on a number of model updates and a historical total model loss, and P1 and P2 are both natural numbers.

In this embodiment of this application, the training process of the face feature extraction model is similar to the foregoing, and details are not described herein again. In addition to resnet101, different network structures and different pre-training model weights may also be used as basic models, or more layers of networks may be used to form a classification deep feature extraction module.

This application is described below with reference to specific embodiments.

Embodiment I: Video Deduplication for Animals

A reference video is a video 2, and the video 2 includes a video frame 1 and a video frame 2. Based on a specified target object type: bear, face detection is respectively performed on the video frame 1 and the video frame 2 to obtain face images and corresponding face features respectively included in the video frame 1 and the video frame 2. The video frame 1 includes two face images, and the video frame 2 includes two face images.

Based on the foregoing target object type, limb detection is performed respectively on the video frame 1 and the video frame 2, and limb images and corresponding limb features respectively included in the video frame 1 and the video frame 2 are determined. The video frame 1 includes two limb images, and the video frame 2 includes two limb images.

Two reference motion trajectories corresponding to the video 2 are obtained based on the determined face images and limb images. The reference motion trajectory 1 includes two limb features and two face features of a bear 1, and the reference motion trajectory 1 includes two limb features and two face features of a bear 2.

A target video having a corresponding candidate motion trajectory matching that of the reference video is determined from candidate videos based on the obtained reference motion trajectory 1 and reference motion trajectory 2 of the video 2 and based on the corresponding candidate motion trajectory of each candidate video.

Embodiment II: Outfit Recommendation Based on TV Series

A reference video is a TV series, and a specified target object type is a person. Reference motion trajectories included in the reference video are obtained, and each reference motion trajectory is a plurality of limb features and a plurality of face features of a protagonist or a supporting role in the TV series. Then a set quantity of reference motion trajectories are determined from the reference motion trajectories in an order of the quantity from large to small based on a quantity of limb features included in each reference motion trajectory.

Other reference motion trajectories included in the TV series other than the determined reference motion trajectory are used as to-be-processed trajectories. To be specific, the TV series is both a reference video and a candidate video. A target video having a corresponding candidate motion trajectory matching that of the reference video is determined from the candidate videos based on the determined reference motion trajectory and the candidate motion trajectory corresponding to each candidate video. The target video matching the reference video is a video composed of different motion trajectories of the same target object.

Exemplarily, first four face images having the largest quantity of limb images may be determined from the reference motion trajectories, then different trajectories respectively corresponding to the first four face images are determined from the first four reference motion trajectories, and then the target video is obtained based on the different trajectories corresponding to the first four face images. A limb image with the highest picture quality may be selected from the different trajectories corresponding to the first four face images for display.

Embodiment III: Video Clip

A long video is used as an example, and a specified target object type is a person. Each reference motion trajectory included in a reference video is obtained based on the specified target object type, and then a set quantity of reference motion trajectories are determined from the reference motion trajectories in an order of the quantity from large to small based on a quantity of limb features included in each reference motion trajectory.

Other reference motion trajectories included in the long video other than the determined reference motion trajectory are used as to-be-processed trajectories. To be specific, the long video is both a reference video and a candidate video. A target video having a corresponding candidate motion trajectory matching that of the reference video is determined from the candidate videos based on the determined reference motion trajectory and the candidate motion trajectory corresponding to each candidate video. The target video matching the reference video is a video composed of motion trajectories of face images belonging to the same target object and having different expressions.

Exemplarily, first four face images having the largest quantity of limb images may be determined from each reference motion trajectory, then different trajectories respectively corresponding to the first four face images are determined from the first four reference motion trajectories. Then motion trajectories of face images that belong to the same target object as the first four face images and have different expressions from the first four face images are selected from the reference motion trajectories corresponding to the first four face images, and the target video is obtained and displayed. To ensure a constant duration of occurrence of the expression, 10 frames before and after each expression are selected.

Figure 19:
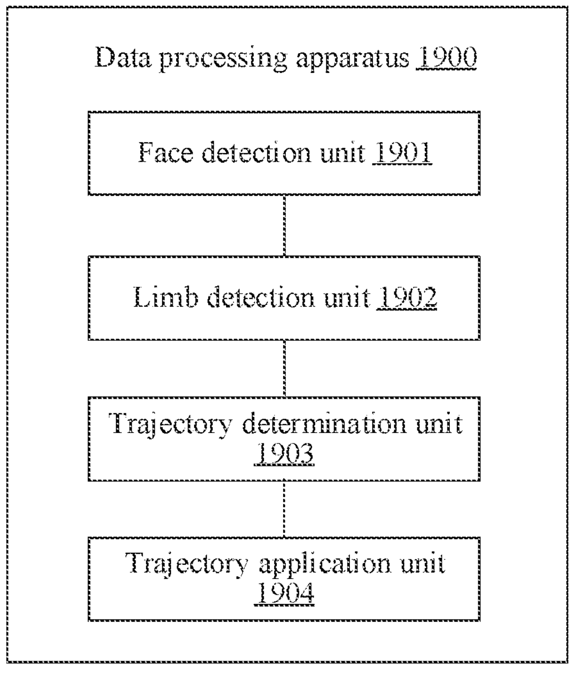
FIG. 19 is a schematic structural diagram of a data processing apparatus according to an embodiment of this application.

Based on the same inventive concept, an embodiment of this application provides a data processing apparatus. As shown in FIG. 19, a schematic structural diagram of a data processing apparatus 1900 is shown. The data processing apparatus may include:

a face detection unit 1901, configured to respectively perform face detection on a plurality of reference video frames included in a reference video based on a specified target object type, determine at least one face image included in each of the plurality of reference video frames, and extract a face feature from the face image;

a limb detection unit 1902, configured to respectively perform limb detection on the plurality of reference video frames based on the target object type, determine at least one limb image included in each of the plurality of reference video frames; and extract a limb feature from the limb image;

a trajectory determination unit 1903, configured to obtain at least one reference motion trajectory corresponding to the reference video based on each face image and each limb image that are determined, each reference motion trajectory including a plurality of limb features and a plurality of face features of a target object; and a trajectory application unit 1904, configured to determine a target video from the candidate videos based on each obtained reference motion trajectory and based on a candidate motion trajectory corresponding to each of the candidate videos.

The face detection unit 1901, the limb detection unit 1902, the trajectory determination unit 1903, and the trajectory application unit 1904 cooperate with each other to implement the functions of the data processing apparatus 1900 in the foregoing embodiments.

For ease of description, the foregoing parts are divided into modules (or units) based on their functions and described separately. Certainly, during implementation of this application, the functions of the modules (units) may be implemented in the same piece of or a plurality of pieces of software or hardware.

The specific manners of executing requests by various units of the apparatuses in the foregoing embodiments are described in detail in the embodiments related to the method, and details are not described herein.

In this embodiment of this application, through mining of the face images and the limb images in the video, a difference between the images may be expressed more accurately by using the face features and the limb features compared with global video representation of the related art, thereby improving the accuracy of image retrieval. In addition, compared with extracting one feature per frame in the related art, in this application, long video information may be extracted more accurately by obtaining the reference motion trajectory including limb features and face features, thereby achieving a better image retrieval effect.

Compared with the method of retrieving a single video embedding, information represented by features in this application is more clear, which contributes to analysis of a particular category of target objects, optimization of hard samples, and continued iteration of models.

In addition, by designing effective detail texture aggregation of face images and limb images, different face images and limb images are represented, and different images in the same video are mined for triplet learning, which improves the representation effect of the face images and the limb images and provides more accurate similarity information for subsequent image deduplication.

A person skilled in the art can understand that the aspects of this application may be implemented as systems, methods, or program products. Therefore, the aspects of this application may be specifically embodied in the following forms: hardware only implementations, software only implementations (including firmware, micro code, and the like), or implementations with a combination of software and hardware, which are collectively referred to as "circuit", "module", or "system" herein.

Figure 20:
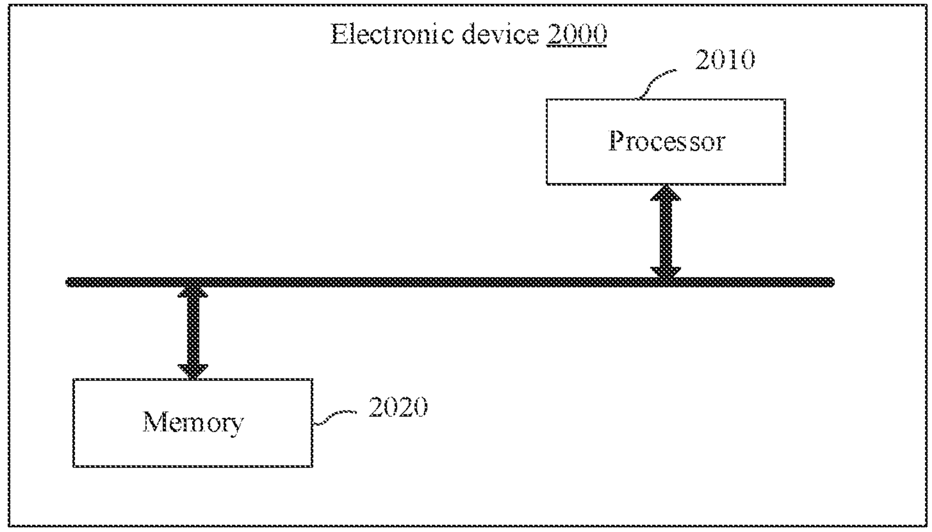
FIG. 20 is a schematic structural diagram of an electronic device according to an embodiment of this application.

Based on the same inventive concept, an embodiment of this application further provides an electronic device. In an embodiment, the electronic device may be a server, or may be a terminal device. FIG. 20 is a schematic structural diagram of a possible electronic device according to an embodiment of this application. In FIG. 20, the electronic device 2000 includes a processor 2010 and a memory 2020.

The memory 2020 has a computer program executable by the processor 2010 stored therein, and the processor 2010 may perform the steps of the foregoing data processing method by executing an instruction stored in the memory 2020.

The memory 2020 may be a volatile memory, for example, a random-access memory (RAM). The memory 2020 may alternatively be a non-volatile memory, for example, a read-only memory (ROM), a flash memory, a hard disk drive (HDD), or a solid-state drive (SSD). Alternatively, the memory 2020 is any other medium that can be configured to carry or store desired program code in the form of instructions or data structures and can be accessed by a computer, which is not limited thereto. The memory 2020 may alternatively be a combination of the foregoing memories.

The processor 2010 may include one or more central processing units (CPUs), a digital processing unit, or the like. The processor 2010 is configured to implement the foregoing data processing method when executing the computer program stored in the memory 2020.

In some embodiments, the processor 2010 and the memory 2020 may be implemented on the same chip. In some embodiments, they may also be implemented separately on independent chips.

A specific connection medium between the processor 2010 and the memory 2020 is not limited in the embodiments of this application. In the embodiments of this application, an example in which the processor 2010 is connected to the memory 2020 by bus is used. The bus is depicted by thick lines in FIG. 20. The connection modes between other components are only for schematic illustration and are not limited thereto. The bus may be classified as an address bus, a data bus, a control bus, and the like. For ease of representation, only one thick line is used to represent the bus in FIG. 20, but this does not mean that only one bus or only one type of bus exists.

Based on the same inventive concept, an embodiment of this application provides a computer-readable storage medium, including a computer program, the computer program, when run on an electronic device, being used for causing the electronic device to perform the steps of the foregoing data processing method. In some possible implementations, various aspects of the data processing method provided in this application may also be implemented in the form of a program product. The program product includes a computer program. When the program product is run on an electronic device, the computer program is used for causing the electronic device to perform the steps of the foregoing data processing method. For example, the electronic device may perform the steps shown in FIG. 2.

The program product may be any combination of one or more readable mediums. The readable medium may be a readable signal medium or a readable storage medium. The readable storage medium may be, for example, but is not limited to, an electric, magnetic, optical, electromagnetic, infrared, or semi-conductive system, apparatus, or device, or any combination thereof. More specific examples (a nonexhaustive list) of the readable storage medium include: an electrical connection having one or more wires, a portable disk, a hard disk, a RAM, a ROM, an erasable programmable read-only memory (EPROM or a flash memory), an optical fiber, a portable compact disk read-only memory (CD-ROM), an optical storage device, a magnetic storage device, or any appropriate combination thereof.

The program product of the implementation of this application may be CD-ROM and include a computer program, and may be run on an electronic device. However, the program product in this application is not limited thereto. In this specification, the readable storage medium may be any tangible medium including or storing a computer program, and the computer program may be used by or used in combination with a command execution system, an apparatus, or a device.

The readable signal medium may include a data signal being in a baseband or transmitted as a part of a carrier, which carries a readable computer program. A data signal propagated in such a way may assume a plurality of forms, including, but not limited to, an electromagnetic signal, an optical signal, or any appropriate combination thereof. The readable storage medium may alternatively be any readable medium other than a readable storage medium, and the readable storage medium may be configured to send, propagate, or transmit a computer program used by or in combination with a command execution system, apparatus, or device.

Although exemplary embodiments of this application have been described, additional changes and modifications to these embodiments may be made by a person skilled in the art once the basic creative concept is apparent. Therefore, the appended claims are intended to be interpreted as including the exemplary embodiments and all changes and modifications that fall within the scope of this application.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules or units. Moreover, each module can be part of an overall module that includes the functionalities of the module. Apparently, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A data processing method performed by an electronic device, the method comprising:

respectively performing face detection and limb detection on at least one reference video frame comprised in a reference video based on a specified target object type, to obtain at least one face image and at least one limb image;

respectively extracting a face feature and a limb feature from the at least one face image and the at least one limb image;

obtaining at least one reference motion trajectory corresponding to the reference video based on each face image and each limb image, each reference motion trajectory comprising a plurality of limb features and a plurality of face features of a target object in the reference video;

obtaining a trajectory similarity between the at least one reference motion trajectory and a candidate motion trajectory corresponding to each of a plurality of candidate videos;

determining a video similarity between the reference video and each candidate video based on the obtained trajectory similarity corresponding to the candidate video; and selecting, among the plurality of candidate videos, a target video whose corresponding video similarity with the reference video exceeds a preset video similarity threshold.

2. The method according to claim 1, wherein the obtaining at least one reference motion trajectory based on each face image and each limb image comprises:

determining a face-limb association relationship between each face image and each limb image based on each face image and each limb image that are determined; and obtaining at least one reference motion trajectory corresponding to the reference video based on the face-limb association relationship and based on a first similarity between the limb features corresponding to the limb images.

3. The method according to claim 2, wherein the determining a face-limb association relationship between each face image and each limb image based on each face image and each limb image that are determined comprises:

respectively performing the following operations for each of a plurality of reference video frames:

calculating an image coincidence proportion between at least one limb image comprised in the reference video frame and at least one face image comprised in the reference video frame; and associating the face image with the limb image in the at least one limb image and the at least one face image having the corresponding image coincidence proportion not less than a coincidence proportion threshold.

4. The method according to claim 2, wherein the obtaining at least one reference motion trajectory corresponding to the reference video based on the face-limb association relationship and based on a first similarity between the limb features corresponding to the limb images comprises:

calculating the first similarity between the limb features corresponding to the limb images, and determining a limb association relationship between a preceding frame and a succeeding frame corresponding to the reference video based on the calculated first similarity; and obtaining the at least one reference motion trajectory corresponding to the reference video based on the face-limb association relationship and the limb association relationship between a preceding frame and a succeeding frame.

5. The method according to claim 2, wherein after the obtaining the at least one reference motion trajectory based on each face image and each limb image, the method further comprises:

determining, when a plurality of reference motion trajectories exist, a second similarity among a plurality of face signs comprised in each of the plurality of reference motion trajectories; and determining a trajectory association relationship among the plurality of reference motion trajectories based on each determined second similarity.

6. The method according to claim 5, wherein the determining a trajectory association relationship among the plurality of reference motion trajectories based on each determined second similarity comprises:

performing the following operations for any two reference motion trajectories comprised in the plurality of reference motion trajectories:

calculating second similarities between a plurality of face features comprised in one reference motion trajectory and a plurality of face features comprised in another reference motion trajectory, and screening out, from the calculated second similarities, a target second similarity not less than a second similarity threshold; and storing a trajectory association relationship between the any two reference motion trajectories when it is determined based on each screened target second similarity that the any two reference motion trajectories belong to a same target object.

7. The method according to claim 1, wherein the face feature is obtained by inputting at least one face image comprised in each of the plurality of reference video frames into a trained target face feature extraction model, the target face feature extraction model being obtained through epoch training, and the method further comprises:

training a target face feature by:

performing the following operations during each epoch:

constructing a training dataset corresponding to each batch based on each similar sample set comprised in a sample dataset and a preset batch data processing capacity, each training data comprising at least three samples, the similar sample set corresponding to one of the at least three samples being different from the similar sample set corresponding to another sample; and inputting constructed training subsets into an initial face feature extraction model in batches to obtain a corresponding total model loss, adjusting the initial face feature extraction model based on the obtained total model loss, and outputting a target face feature extraction model when it is determined that a convergence condition is satisfied.

8. An electronic device comprising a processor and a memory, the memory having a computer program stored therein, the computer program, when executed by the processor, causing the electronic device to perform a data processing method including:

respectively performing face detection and limb detection on at least one reference video frame comprised in a reference video based on a specified target object type, to obtain at least one face image and at least one limb image;

respectively extracting a face feature and a limb feature from the at least one face image and the at least one limb image;

obtaining at least one reference motion trajectory corresponding to the reference video based on each face image and each limb image, each reference motion trajectory comprising a plurality of limb features and a plurality of face features of a target object in the reference video;

obtaining a trajectory similarity between the at least one reference motion trajectory and a candidate motion trajectory corresponding to each of a plurality of candidate videos;

determining a video similarity between the reference video and each candidate video based on the obtained trajectory similarity corresponding to the candidate video; and selecting, among the plurality of candidate videos, a target video whose corresponding video similarity with the reference video exceeds a preset video similarity threshold.

9. The electronic device according to claim 8, wherein the obtaining at least one reference motion trajectory based on each face image and each limb image comprises:

determining a face-limb association relationship between each face image and each limb image based on each face image and each limb image that are determined; and obtaining at least one reference motion trajectory corresponding to the reference video based on the face-limb association relationship and based on a first similarity between the limb features corresponding to the limb images.

10. The electronic device according to claim 9, wherein the determining a face-limb association relationship between each face image and each limb image based on each face image and each limb image that are determined comprises:

respectively performing the following operations for each of a plurality of reference video frames:

calculating an image coincidence proportion between at least one limb image comprised in the reference video frame and at least one face image comprised in the reference video frame; and associating the face image with the limb image in the at least one limb image and the at least one face image having the corresponding image coincidence proportion not less than a coincidence proportion threshold.

11. The electronic device according to claim 9, wherein the obtaining at least one reference motion trajectory corresponding to the reference video based on the face-limb association relationship and based on a first similarity between the limb features corresponding to the limb images comprises:

calculating the first similarity between the limb features corresponding to the limb images, and determining a limb association relationship between a preceding frame and a succeeding frame corresponding to the reference video based on the calculated first similarity; and obtaining the at least one reference motion trajectory corresponding to the reference video based on the face-limb association relationship and the limb association relationship between a preceding frame and a succeeding frame.

12. The electronic device according to claim 9, wherein after the obtaining the at least one reference motion trajectory based on each face image and each limb image, the method further comprises:

determining, when a plurality of reference motion trajectories exist, a second similarity among a plurality of face signs comprised in each of the plurality of reference motion trajectories; and determining a trajectory association relationship among the plurality of reference motion trajectories based on each determined second similarity.

13. The electronic device according to claim 12, wherein the determining a trajectory association relationship among the plurality of reference motion trajectories based on each determined second similarity comprises:

performing the following operations for any two reference motion trajectories comprised in the plurality of reference motion trajectories:

calculating second similarities between a plurality of face features comprised in one reference motion trajectory and a plurality of face features comprised in another reference motion trajectory, and screening out, from the calculated second similarities, a target second similarity not less than a second similarity threshold; and storing a trajectory association relationship between the any two reference motion trajectories when it is determined based on each screened target second similarity that the any two reference motion trajectories belong to a same target object.

14. The electronic device according to claim 8, wherein the face feature is obtained by inputting at least one face image comprised in each of the plurality of reference video frames into a trained target face feature extraction model, the target face feature extraction model being obtained through epoch training, and the method further comprises:

training a target face feature by:

performing the following operations during each epoch:

constructing a training dataset corresponding to each batch based on each similar sample set comprised in a sample dataset and a preset batch data processing capacity, each training data comprising at least three samples, the similar sample set corresponding to one of the at least three samples being different from the similar sample set corresponding to another sample; and inputting constructed training subsets into an initial face feature extraction model in batches to obtain a corresponding total model loss, adjusting the initial face feature extraction model based on the obtained total model loss, and outputting a target face feature extraction model when it is determined that a convergence condition is satisfied.

15. A non-transitory computer-readable storage medium comprising a computer program, the computer program, when run on an electronic device, causing the electronic device to perform a data processing method including:

respectively performing face detection and limb detection on at least one reference video frame comprised in a reference video based on a specified target object type, to obtain at least one face image and at least one limb image;

respectively extracting a face feature and a limb feature from the at least one face image and the at least one limb image;

obtaining at least one reference motion trajectory corresponding to the reference video based on each face image and each limb image, each reference motion trajectory comprising a plurality of limb features and a plurality of face features of a target object in the reference video;

obtaining a trajectory similarity between the at least one reference motion trajectory and a candidate motion trajectory corresponding to each of a plurality of candidate videos;

determining a video similarity between the reference video and each candidate video based on the obtained trajectory similarity corresponding to the candidate video; and selecting, among the plurality of candidate videos, a target video whose corresponding video similarity with the reference video exceeds a preset video similarity threshold.

16. The non-transitory computer-readable storage medium according to claim 15, wherein the obtaining at least one reference motion trajectory based on each face image and each limb image comprises:

determining a face-limb association relationship between each face image and each limb image based on each face image and each limb image that are determined; and obtaining at least one reference motion trajectory corresponding to the reference video based on the face-limb association relationship and based on a first similarity between the limb features corresponding to the limb images.

17. The non-transitory computer-readable storage medium according to claim 16, wherein the determining a face-limb association relationship between each face image and each limb image based on each face image and each limb image that are determined comprises:

respectively performing the following operations for each of a plurality of reference video frames:

calculating an image coincidence proportion between at least one limb image comprised in the reference video frame and at least one face image comprised in the reference video frame; and associating the face image with the limb image in the at least one limb image and the at least one face image having the corresponding image coincidence proportion not less than a coincidence proportion threshold.

18. The non-transitory computer-readable storage medium according to claim 16, wherein the obtaining at least one reference motion trajectory corresponding to the reference video based on the face-limb association relationship and based on a first similarity between the limb features corresponding to the limb images comprises:

calculating the first similarity between the limb features corresponding to the limb images, and determining a limb association relationship between a preceding frame and a succeeding frame corresponding to the reference video based on the calculated first similarity; and obtaining the at least one reference motion trajectory corresponding to the reference video based on the face-limb association relationship and the limb association relationship between a preceding frame and a succeeding frame.

19. The non-transitory computer-readable storage medium according to claim 16, wherein after the obtaining the at least one reference motion trajectory based on each face image and each limb image, the method further comprises:

determining, when a plurality of reference motion trajectories exist, a second similarity among a plurality of face signs comprised in each of the plurality of reference motion trajectories; and determining a trajectory association relationship among the plurality of reference motion trajectories based on each determined second similarity.

20. The non-transitory computer-readable storage medium according to claim 15, wherein the face feature is obtained by inputting at least one face image comprised in each of the plurality of reference video frames into a trained target face feature extraction model, the target face feature extraction model being obtained through epoch training, and the method further comprises:

training a target face feature by:

performing the following operations during each epoch:

constructing a training dataset corresponding to each batch based on each similar sample set comprised in a sample dataset and a preset batch data processing capacity, each training data comprising at least three samples, the similar sample set corresponding to one of the at least three samples being different from the similar sample set corresponding to another sample; and inputting constructed training subsets into an initial face feature extraction model in batches to obtain a corresponding total model loss, adjusting the initial face feature extraction model based on the obtained total model loss, and outputting a target face feature extraction model when it is determined that a convergence condition is satisfied.

* * * * *